(12) United States Patent
Beausoleil et al.

(10) Patent No.: US 9,593,832 B2
(45) Date of Patent: Mar. 14, 2017

(54) LOW VOLTAGE SECURITY LIGHTING SYSTEMS FOR PERIMETER FENCES

(71) Applicants: David M. Beausoleil, Ridgewood, NJ (US); Paul Eugene Britt, Los Angeles, CA (US)

(72) Inventors: David M. Beausoleil, Ridgewood, NJ (US); Paul Eugene Britt, Los Angeles, CA (US)

(73) Assignee: Mind Head LLC, Ridgewood, NJ (US)

( * ) Notice: Subject to any disclaimer, the term of this patent is extended or adjusted under 35 U.S.C. 154(b) by 131 days.

(21) Appl. No.: 13/649,939

(22) Filed: Oct. 11, 2012

(65) Prior Publication Data
US 2014/0104831 A1 Apr. 17, 2014

Related U.S. Application Data

(63) Continuation-in-part of application No. 13/357,688, filed on Jan. 25, 2012, now Pat. No. 8,845,124.

(51) Int. Cl.
*F21S 8/00* (2006.01)
*F21V 23/04* (2006.01)
(Continued)

(52) U.S. Cl.
CPC .......... *F21V 23/0407* (2013.01); *F21V 23/02* (2013.01); *F21V 23/0471* (2013.01);
(Continued)

(58) Field of Classification Search
CPC .... F21V 21/088; F21V 21/0885; F21V 21/00; F21V 21/116; F21V 21/06;
(Continued)

(56) References Cited

U.S. PATENT DOCUMENTS 1,806,773 A  5/1931 Waters
2,512,188 A * 6/1950 Wait ...................... H02G 3/123
                                                        126/273 A
(Continued)

FOREIGN PATENT DOCUMENTS

WO    2010087697    8/2010

*Primary Examiner* — Jong-Suk (James) Lee
*Assistant Examiner* — James Endo
(74) *Attorney, Agent, or Firm* — Doherty IP Law Group LLC

(57) ABSTRACT

A security lighting system includes a transformer for transforming high voltage current to low voltage current, and a wiring run having electrically conductive wiring for connecting a plurality of security lights to the transformer. Each security light includes a light module having a low voltage LED light, a hat covering the LED light, and a junction box coupled with the light module. The junction box has an interior compartment containing electrical components including a microprocessor connected with the LED light for controlling operation of the LED light, whereby the electrical components within the junction box are electrically connected with the wiring run. A clamping assembly is coupled with the junction box for securing the security light to a fixed element. Each security light includes a light module having the LED light and the hat overlies the LED light to block the escape of direct light from the light module while allowing reflected light to escape from the light module.

21 Claims, 34 Drawing Sheets

(51) Int. Cl.

| | | |
|---|---|---|
| *F21V 23/02* | (2006.01) | |
| *F21V 21/088* | (2006.01) | |
| *F21V 21/108* | (2006.01) | |
| *F21V 21/116* | (2006.01) | |
| *F21V 21/08* | (2006.01) | |
| *H02G 3/08* | (2006.01) | |
| *H02G 3/14* | (2006.01) | |
| *F21S 8/08* | (2006.01) | |
| *F21W 131/10* | (2006.01) | |
| *F21V 23/00* | (2015.01) | |
| *F21W 131/103* | (2006.01) | |
| *F21W 131/107* | (2006.01) | |
| *F21V 7/00* | (2006.01) | |
| *F21V 17/00* | (2006.01) | |
| *F16M 13/02* | (2006.01) | |
| *F21V 33/00* | (2006.01) | |
| *F21W 131/105* | (2006.01) | |
| *F21W 131/109* | (2006.01) | |
| *F21Y 101/00* | (2016.01) | |

(52) U.S. Cl.
CPC ............. *F16M 13/02* (2013.01); *F21S 8/081* (2013.01); *F21S 8/083* (2013.01); *F21S 8/088* (2013.01); *F21V 7/0008* (2013.01); *F21V 17/00* (2013.01); *F21V 21/08* (2013.01); *F21V 21/088* (2013.01); *F21V 21/0885* (2013.01); *F21V 21/108* (2013.01); *F21V 21/116* (2013.01); *F21V 23/002* (2013.01); *F21V 23/006* (2013.01); *F21V 23/008* (2013.01); *F21V 33/006* (2013.01); *F21W 2131/10* (2013.01); *F21W 2131/103* (2013.01); *F21W 2131/105* (2013.01); *F21W 2131/107* (2013.01); *F21W 2131/109* (2013.01); *F21Y 2101/00* (2013.01); *H02G 3/08* (2013.01); *H02G 3/081* (2013.01); *H02G 3/086* (2013.01); *H02G 3/14* (2013.01)

(58) Field of Classification Search
CPC ...... F21V 21/08; F21V 21/108; F21V 33/006; F21V 21/30; F21V 23/002; F21V 31/005; F21V 7/0008; F21V 17/00; F21V 23/008; F21S 8/024; F21S 8/003; F21S 8/081; F21S 8/083; F21S 4/003; F21S 6/007; F21S 6/005; F21S 8/088; H02G 3/14; H02G 3/081; H02G 3/083; H02G 3/08; H02G 3/086; F16M 13/02; F16M 11/22; F21W 2131/109; F21W 2131/10; F21W 2131/103; F21W 2131/107; F21W 2131/105; F21W 2131/101; F21W 2131/1005; H01Q 1/1207; E04F 2011/1872; E01F 9/016; E01F 9/0165; E01F 9/0182
USPC ....... 362/431, 433, 370, 432, 453, 455, 152, 362/145, 146, 374, 375, 559, 442, 452, 362/441; 428/74.1, 74.4, 229.12; 248/540, 541, 74.1, 74.4, 229.12, 539, 248/346.03, 689, 218.4, 219.4, 906; 174/50, 520, 535, 559, 560, 561, 562, 53, 174/57, 58, 59, 61, 62, 63, 60, 563, 542, 174/541, 551, 556, 555, 543, 549; 439/4, 439/501, 528; 315/291
See application file for complete search history.

(56) References Cited

U.S. PATENT DOCUMENTS

| | | | | |
|---|---|---|---|---|
| 2,883,135 | A * | 4/1959 | Smalley | H01F 27/06 248/230.5 |
| 2,883,136 | A * | 4/1959 | Smalley | H01F 27/06 248/230.5 |
| 3,222,509 | A | 12/1965 | Thedford | |
| 4,057,164 | A * | 11/1977 | Maier | H02G 3/126 174/57 |
| 4,626,974 | A | 12/1986 | Dean | |
| 4,724,282 | A * | 2/1988 | Troder | H02G 3/083 174/661 |
| 4,922,057 | A * | 5/1990 | Ross | H02G 3/083 174/661 |
| 4,959,018 | A * | 9/1990 | Yamamoto | H01R 9/2458 174/559 |
| 5,161,874 | A * | 11/1992 | Benes | 362/552 |
| 5,272,279 | A * | 12/1993 | Filshie | H02B 1/40 174/50 |
| 5,280,132 | A * | 1/1994 | Clarey | H02B 1/16 174/50 |
| 5,414,607 | A * | 5/1995 | Harris | F21S 8/081 362/362 |
| 5,429,340 | A | 7/1995 | Young et al. | |
| 5,663,525 | A * | 9/1997 | Newman | H02B 1/305 174/50 |
| 5,683,176 | A * | 11/1997 | Clendenin | 362/385 |
| 5,718,403 | A | 2/1998 | Ott et al. | |
| 5,887,856 | A | 3/1999 | Everly, III | |
| 6,290,375 | B1 * | 9/2001 | LeVasseur | 362/368 |
| 6,365,831 | B1 * | 4/2002 | Rupp et al. | 174/50 |
| 6,407,713 | B1 * | 6/2002 | Mallenius | 343/765 |
| 6,460,951 | B1 * | 10/2002 | Baxter | H04Q 1/10 174/50 |
| 6,523,982 | B1 | 2/2003 | Haddad | |
| 6,722,637 | B2 | 4/2004 | Burkart et al. | |
| D506,281 | S * | 6/2005 | Randazzo | D26/67 |
| D518,221 | S * | 3/2006 | Randazzo | D26/68 |
| D524,475 | S * | 7/2006 | Randazzo | D26/71 |
| 7,154,040 | B1 * | 12/2006 | Tompkins | H02G 3/126 174/50 |
| 7,543,968 | B2 * | 6/2009 | Chen | 362/427 |
| 7,587,860 | B1 | 9/2009 | Ilyas et al. | |
| 7,661,837 | B1 | 2/2010 | Pever et al. | |
| 8,534,867 | B1 * | 9/2013 | Beadle | 362/235 |
| 8,867,235 | B2 * | 10/2014 | Veillette | 361/826 |
| 2001/0052595 | A1 | 12/2001 | Hulett | |
| 2002/0148183 | A1 | 10/2002 | Grant | |
| 2003/0066992 | A1 | 4/2003 | Burkart et al. | |
| 2003/0075712 | A1 | 4/2003 | Lin | |
| 2003/0206411 | A9 * | 11/2003 | Dowling et al. | 362/234 |
| 2004/0095772 | A1 * | 5/2004 | Hoover et al. | 362/363 |
| 2004/0100793 | A1 * | 5/2004 | Monitto | F21V 21/0824 362/153.1 |
| 2007/0029459 | A1 * | 2/2007 | Hanson | E04H 12/2215 248/530 |
| 2007/0222399 | A1 | 9/2007 | Bondy et al. | |
| 2008/0099751 | A1 | 5/2008 | Chen | |
| 2008/0180937 | A1 * | 7/2008 | Pengelly | 362/85 |
| 2008/0296545 | A1 | 12/2008 | Chef | |
| 2009/0021952 | A1 * | 1/2009 | McBride et al. | 362/431 |
| 2009/0272559 | A1 * | 11/2009 | Richter et al. | 174/59 |
| 2010/0002432 | A1 * | 1/2010 | Romano | F21S 48/328 362/235 |
| 2010/0025559 | A1 * | 2/2010 | Rathbone et al. | 248/534 |
| 2010/0097206 | A1 | 4/2010 | Jung et al. | |
| 2010/0208466 | A1 | 8/2010 | Luo et al. | |
| 2010/0214775 | A1 * | 8/2010 | Liang | 362/184 |
| 2010/0327766 | A1 * | 12/2010 | Recker et al. | 315/291 |
| 2010/0327768 | A1 | 12/2010 | Kong et al. | |
| 2011/0080749 | A1 | 4/2011 | Roth | |
| 2011/0155455 | A1 * | 6/2011 | Chou et al. | 174/560 |
| 2013/0077327 | A1 * | 3/2013 | Butler et al. | 362/431 |

* cited by examiner

Example 3: 500 ft. homerun, 16 luminaires, plus 5 ft. wire per luminaire (300 + 90 = 390 ft.) - Use #12/2.

FIG. 29

| | 600' perimeter lighting system using traditional 50 watt 240 volt fence lights. Assumes a 300 foot run to electrical pannel | | | |
|---|---|---|---|---|
| | HIGH VOLTAGE | | | |
| | Material AVAN Quote # 000888 | 1 | $5,130.00 | $5,130.00 |
| * | Trenching machine rental per day | 2 | $300.00 | $600.00 |
| * | Trenching and Backfill 800' 1-1/4" 24" to code in parking lot. No asphalt patch | 800 | $3.00 | $2,400.00 |
| * | Attach 17 Fixtures Plus Junction Box | 17 | $65.00 | $1,105.00 |
| * | Installation of electrical conduit, wire etc | 600 | $10.00 | $6,000.00 |
| * | Interior electrical work Labor etc | 2 | $65.00 | $130.00 |
| * | Installed Prices provided by local electrician | | Total | $17,365.00 |
| | OPERATING COSTS | | | |
| | Total Watts Consumed 50 x 17=850 | 850 | | |
| | Plus Line loss 20% | 170 | | |
| | Total Watts | 1020 | | |
| | Divided by 1000 | 1.020 | | |
| | Per KW Hour cost | $0.150 | 15 cents | |
| | One hour | $0.153 | | |
| | Ten Hour Night | $1.530 | | |
| | 7 nights a week | $10.710 | | |
| | 30 nights month | $45.900 | | |
| | 365 days a year | $558.450 | | |

FIG. 35

| | 500' Perimeter Lighting system using Cast Lightings 7 Watt LED system and remote 24Volt Transformer | | | |
|---|---|---|---|---|
| | LED Lighting | | | |
| | Cast Lighting CPL1 Perimeter Lighting System | 17 | $85.00 | $1,445.00 |
| ** | CPT300 24V transformer | 1 | $185.00 | $185.00 |
| | #14-2 Wire roll 500 feet | 1 | $156.91 | $156.91 |
| | #10-2 500 Wire (200' Left Over) | 1 | $331.00 | $331.00 |
| | Two Men at 8 Hours installation 200 hr | 8 | $200.00 | $1,600.00 |
| | | | Total | $3,717.91 |
| ** | Assumes 120Volt outlet is available to plug into for transformer | | | |
| | OPERATING COSTS | | | |
| | Total Watts on system 7 x 17 | 119 | | |
| | Plus Line loss 20% | 36 | | |
| | Total Watts | 155 | | |
| | Divided by 1000 | 0.155 | | |
| | Per KW Hour cost | $0.150 | 15 cents | |
| | One hour | $0.023 | | |
| | Ten Hour Night | $0.233 | | |
| | 7 nights a week | $1.628 | | |
| | 30 nights month | $6.975 | | |
| | 365 days a year | $84.863 | | |

FIG. 36

| | |
|---|---|
| LED Fixture lasts 50000 hours to L70 | |
| Clean when dirty every 5 years | $204.00 |
| Number of Cleanings | 3 |
| labor to clean lamps | $612.00 |
| | |

| | |
|---|---|
| Metal Halide ED17 -E26 50 Watt Lamp lasts 10,000 HRS | |
| Number of lamp replacements | 5 |
| number of fixtures | 17 |
| Cost per lamp | 17.14 |
| Total cost for lamp replacement | $1,456.90 |
| | |
| Total labor to replace lamps 1 man at 12 min a fixture | |
| Total minutes 204 or 3.4 hours at $60.00/hr | $204.00 |
| Number of changeouts | 5 |
| Labor to change out lamps | $1,020.00 |
| | |
| Total lifetime maintenance | $2,476.90 |

FIG. 37

LOW VOLTAGE SECURITY LIGHTING SYSTEMS FOR PERIMETER FENCES

CROSS REFERENCE TO RELATED APPLICATIONS

The present application is a continuation-in-part of U.S. patent application Ser. No. 13/357,688, filed Jan. 25, 2012, the disclosure of which is hereby incorporated by reference herein.

BACKGROUND OF THE INVENTION

Field of the Invention

The present application is generally directed to lighting systems, and is more specifically directed to low voltage lighting systems such as security lighting systems for fences.

Description of the Related Art

Lights are often used on or near fences to provide visibility, safety and security. Security lighting is particularly important for perimeter fences that surround secure areas such as automobile lots, military bases, nuclear power plants, industrial sites, college campuses, etc.

Large perimeter fences may extend for hundreds or thousands of feet. The conventional lighting used for these fences is typically 120V, 230V, 277V, or 460V AC single or three phase power. In an effort to minimize the substantial voltage losses that occur with the long cable runs required for large perimeter fences, conventional lighting systems use a significant amount of energy, and require expensive cable and conduit infrastructure. Thus, providing security lighting for a perimeter fence can be very expensive. Moreover, the high voltage lighting must be installed by registered electricians, which takes a significant amount of time (e.g., permits and plans), and costs a significant amount of money.

The area covered by a perimeter fence can be so large that remote cameras must be used to effectively monitor the perimeter. Unfortunately, at night, the light generated by the security lighting may create "hot spots" on the camera lens, effectively blinding the camera, whereupon security personnel may not be able to clearly see the perimeter area of the fence. In addition, direct visual observation by the naked eye may be hampered due to the contrast between nighttime darkness and the light glare generated by the security lights.

In view of the above deficiencies, there is a need for a security lighting system that uses less power, that saves operating and maintenance costs, that requires less labor and time to install, and that may be installed by non-electricians. There is also a need for a security lighting system that generates indirect, reflected light that will not blind remote cameras that are used for monitoring the perimeter of a fence, and that will not adversely affect the ability of the human eye to adjust between a non-illuminated region and an illuminated region.

SUMMARY OF THE INVENTION

The present invention provides an easy to install, low energy security lighting system for existing and new fences, such as perimeter fences, chain-link fences, panel fences, etc. In one embodiment, a security lighting system for a fence includes a plurality of security lights, each security light having a light module with a LED unit adapted to generate light and a hat overlying the LED unit that is adapted to block the escape of direct light from the light module while allowing reflected light to escape from the light module. The system includes a circuit with electrical wiring interconnecting the plurality of security lights, and a transformer connected with the electrical wiring for providing power to the system. In one embodiment, the transformer produces a direct current output, such as 12-24VDC. In one embodiment, the transformer produces an alternating current output such as 12-24VAC.

In one embodiment, each light module includes a central housing having an upper end with a top surface, support arms extending outwardly from the central housing, a depression formed in the top surface of the central housing, and the LED unit disposed in the depression.

In one embodiment, the support arms extend outwardly from the central housing, and each support arm has a top surface that lies in a plane that is parallel to the top surface of the central housing. In one embodiment, the support arms have a triangular cross-sectional shape that minimizes the likelihood of light reflecting off the arm and back into the underside of the hat In one embodiment, the hat is secured to the support arms. The hat has a bottom surface having a concave shape that overlies the LED unit. The concave shaped bottom surface has a centrally located dimple that is aligned over the LED unit. The centrally located dimple divides the concave shaped bottom surface into a first concave region and a second concave region. The concave bottom surface of the hat preferably has a reflective coating for reflecting light generated by the LED unit.

In one embodiment, the support arms are evenly spaced from one another, and the hat has an outer perimeter in contact with the support arms. In one embodiment, the outer perimeter of the hat lies in a plane that is parallel to the surface of the central housing. In one embodiment, the outer surface of the support arms and the central housing of the light module preferably have reflective coatings for maximizing the amount of light that escapes from the security light.

One or more fasteners may be used for securing the hat to the support arms. In one embodiment, the outer ends of the support arms have openings, and the hat has threaded openings accessible at the outer perimeter thereof that are aligned with the support arm openings. In one embodiment, the threaded fasteners are passed through the support arm openings and threaded into the threaded openings of the hat for securing the hat to the support arms.

In one embodiment, the system includes a junction box having an interior compartment adapted to contain electrical components for operating the security light, and an extension tube having an upper end secured to the central housing of the light module and a lower end secured to the junction box.

In one embodiment, the system preferably includes a clamp assembly, such as a saddle style clamp assembly, coupled with the junction box for securing the junction box atop or against a fence post. The system preferably has an alignment system coupled with the junction box for aligning the extension tube with the longitudinal axis of the fence post and aligning the support arms with a plane that is perpendicular to the longitudinal axis of the fence post.

In one embodiment, a security lighting system for a fence has a plurality of security lights mountable to upper ends of fence posts. Each security light may have a light module including a central housing having a top surface, a depression formed in the top surface of the central housing, and a LED unit mounted in the depression for generating light that projects away from and over the top surface of the central housing. A hat preferably covers the top surface and an outer perimeter of the central housing for blocking the escape of direct light from the top and sides of the light module while allowing reflected light to escape from a bottom of the light module. The hat desirably has a concave shaped bottom surface with a reflective coating that opposes the LED unit for reflecting light generated by the LED unit toward the bottom of the light module. The hat is preferably opaque so that no light can pass through the body of the hat.

In one embodiment, a security light preferably has a junction box having an interior compartment adapted to contain electrical components for operating the security light, and an extension tube having an upper end secured to the central housing of the light module and a lower end secured to the junction box. The extension tube has a central conduit for passing electrical wiring from the junction box to the light module. A saddle style clamp assembly is preferably coupled with the junction box for securing the junction box to a fence post on a new or existing fence. An alignment system, separate from the saddle style clamp assembly and coupled with the junction box, is adapted for aligning the extension tube with the longitudinal axis of the fence post and aligning the support arms with a plane that is perpendicular to the longitudinal axis of the fence post.

In one embodiment, a security lighting system for a fence preferably includes one or more motion sensors that are adapted to activate the lighting system or one or more of the security lights, as designated by an installer.

In one embodiment, a security lighting system for a fence preferably includes one or more remote cameras for monitoring the fence. The lighting system may include a video recording system for recording and storing video.

In one embodiment, the system desirably includes electrical wiring interconnecting the plurality of security lights, and a transformer connected with the electrical wiring for providing power to the plurality of security lights. The transformer desirably produces a direct current output of 12-24VDC. In one embodiment, the transformer may produce an alternating current of 12-24VAC.

These and other preferred embodiments of the present invention will be described in more detail below.

BRIEF DESCRIPTION OF THE DRAWING

FIG. 29 shows mounting guidelines for a security lighting system for achieving illuminance values, in accordance with one embodiment of the present invention.

FIG. 35 is a chart showing the installation costs for a prior art high voltage lighting system secured to a fence having a length of 500 feet.

FIG. 36 is a chart showing the installation costs for a low voltage lighting system for secured to a fence having a length of 500 feet.

FIG. 37 is a chart that compares lifetime maintenance costs of the high voltage lighting system of FIG. 35 versus the low voltage lighting system of FIG. 36.

DETAILED DESCRIPTION

Figure 1:
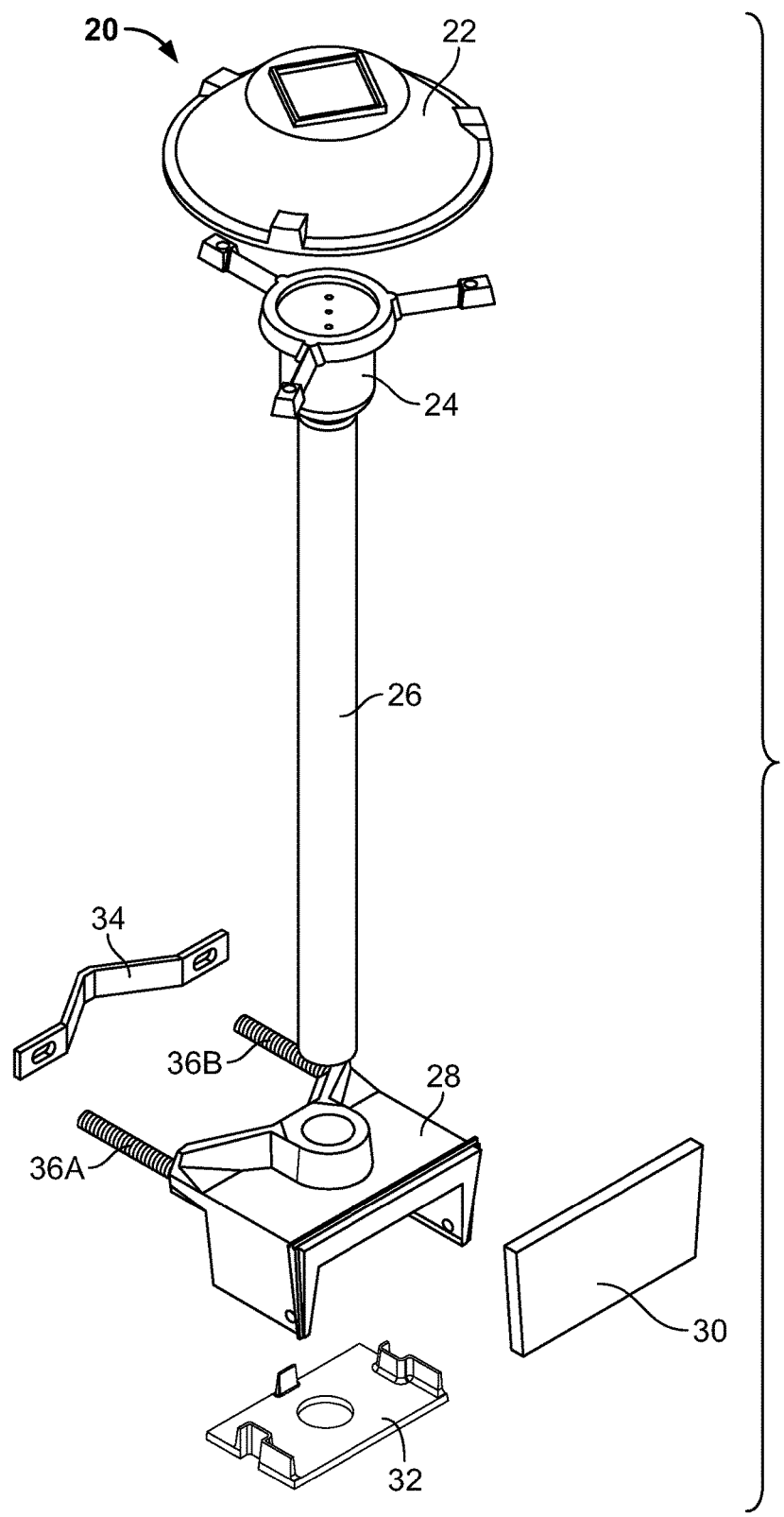
FIG. 1 is an exploded view of a security light for a perimeter fence including a hat, a light module, an extension tube, a junction box, a front cover plate, a bottom cover plate, and a securing bracket, in accordance with one embodiment of the present invention.

Referring to FIG. 1, in one embodiment, a security light 20 includes a hat 22, a light module 24, an extension tube 26, a junction box 28, a front cover plate 30, a bottom cover plate 32, a securing bracket 34, and threaded bolts 36A, 36B that project from a rear end of the junction box.

Figure 2A:
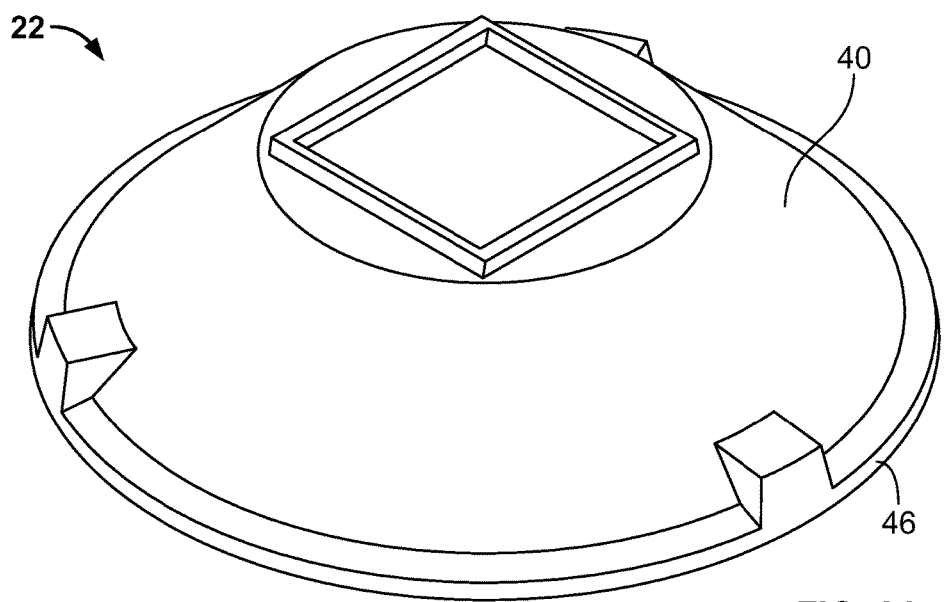
FIG. 2A is a top perspective view of the hat shown in FIG. 1, in accordance with one embodiment of the present invention.
Figure 2B:
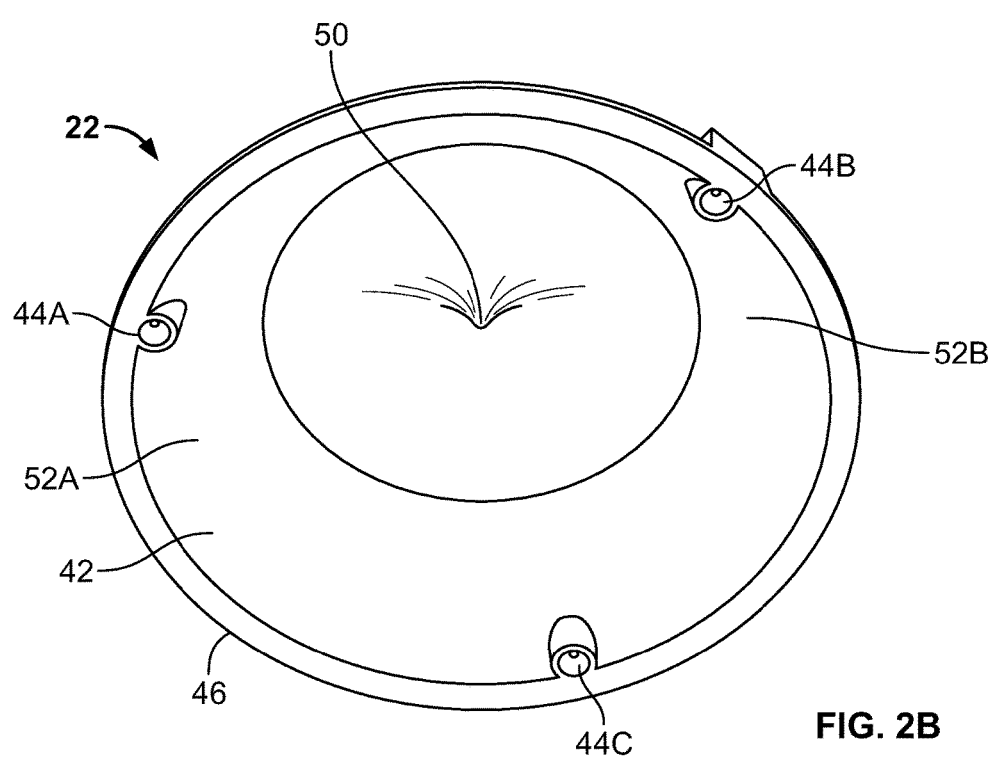
FIG. 2B is a bottom perspective view of the hat shown in FIG. 2A.

Referring to FIGS. 2A and 2B, in one embodiment, the security light includes the hat 22 having a top surface 40 and a bottom surface 42. In one embodiment, the top surface 40 is convex and the bottom surface 42 has a double concave surface. Referring to FIG. 2B, in one embodiment, the hat 22 includes threaded openings 44A-44C that are adapted to receive threaded fasteners for securing the hat over the light module 24 (FIG. 1), as will be described in more detail herein. The threaded openings 44A-44C are preferably evenly spaced from one another around the outer perimeter 46 of the hat 22. In one embodiment, the hat has three threaded openings 44A-44C. In other embodiments, however, the hat 22 may have fewer or more threaded openings that are evenly spaced from one another around the outer perimeter 46 of the hat 22.

In one embodiment, the bottom surface 42 of the hat 22 desirably has a central dimple 50 that divides the bottom surface 42 into a double concavity including a first concave region 52A and a second concave region 52B. The bottom surface 42 may be covered by a reflective coating that reflects light that strikes the bottom surface 42.

Figure 2C:
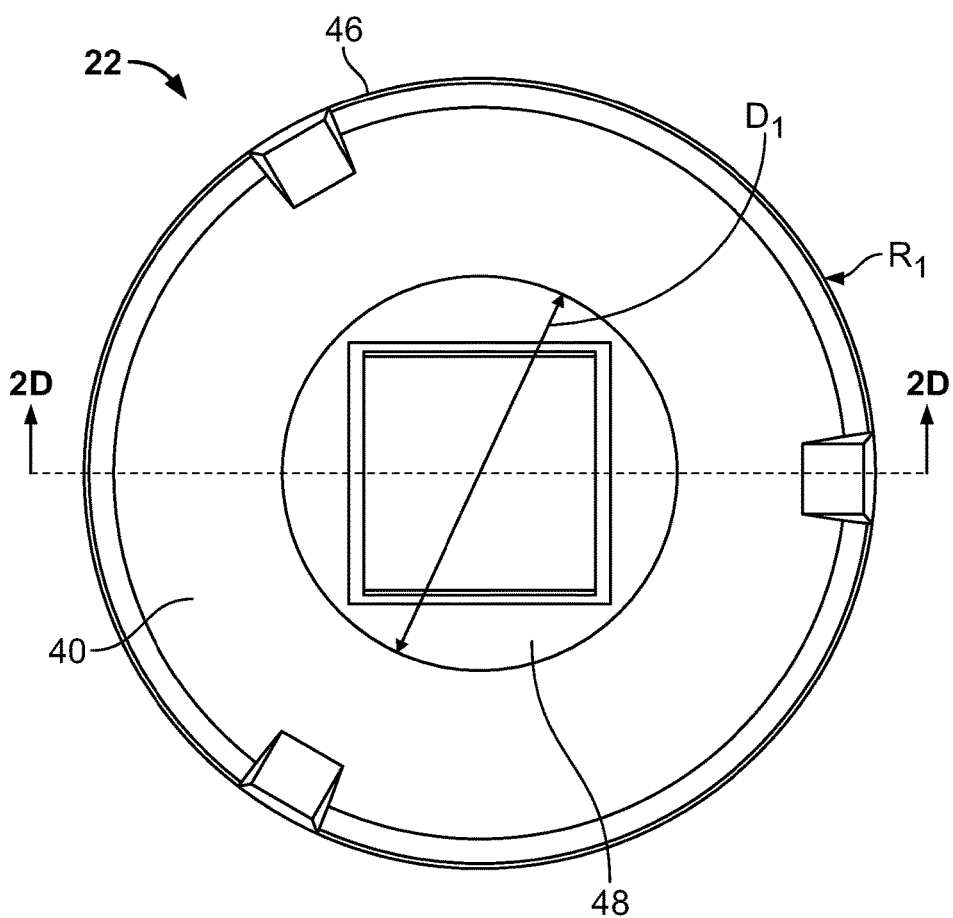
FIG. 2C is a top plan view of the hat shown in FIG. 2A.

Referring to FIG. 2C, in one embodiment, the hat 22 includes the outer perimeter 46 that is preferably circular in shape. The top surface 40 of the hat 22 desirably has a central region 48 adapted for receiving a label, such as a product name or a manufacturer's name. In one embodiment, the central region 48 has a diameter $D_1$ of about 2-3 inches, and more preferably about 2.5 inches. In one embodiment, the outer perimeter 46 of the hat 22 defines a radius $R_1$ of about 2-3 inches, and more preferably about 2.5 inches.

Figure 2D:
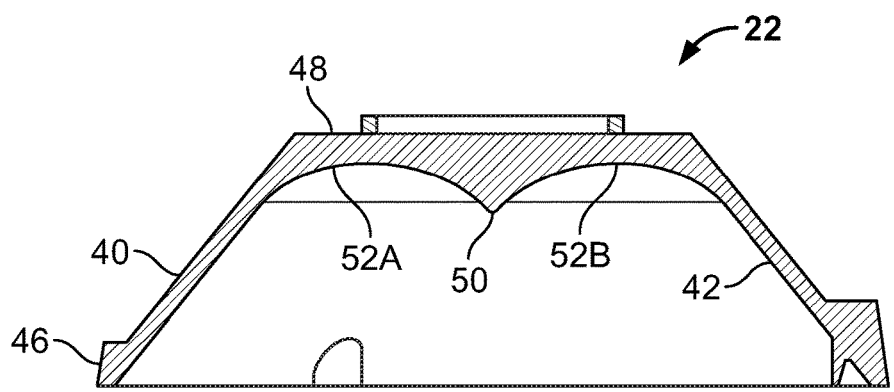
FIG. 2D is a cross-sectional view of the hat shown in FIG. 2C taken along line 2D-2D of FIG. 2C.

Referring to FIG. 2D, in one embodiment, the hat 22 includes the convex top surface 40 and the central region 48. The hat 22 also includes the bottom surface 42 having the double concavity. The centrally located dimple 50 divides the bottom surface 42 into the first concave region 52A and the second concave region 52B. Referring to FIGS. 2B and 2D, the centrally located dimple 50 is desirably centrally located within the concave bottom surface 42. In one embodiment, the central dimple 50 is preferably evenly spaced from the threaded openings 44A-44C provided at the perimeter 46 of the hat 22. In one embodiment, the dimple 50 and the double concave surface 42 preferably reflect light that strikes the bottom surface on an outer direction toward the outer perimeter 46 of the hat 22.

Figure 3A:
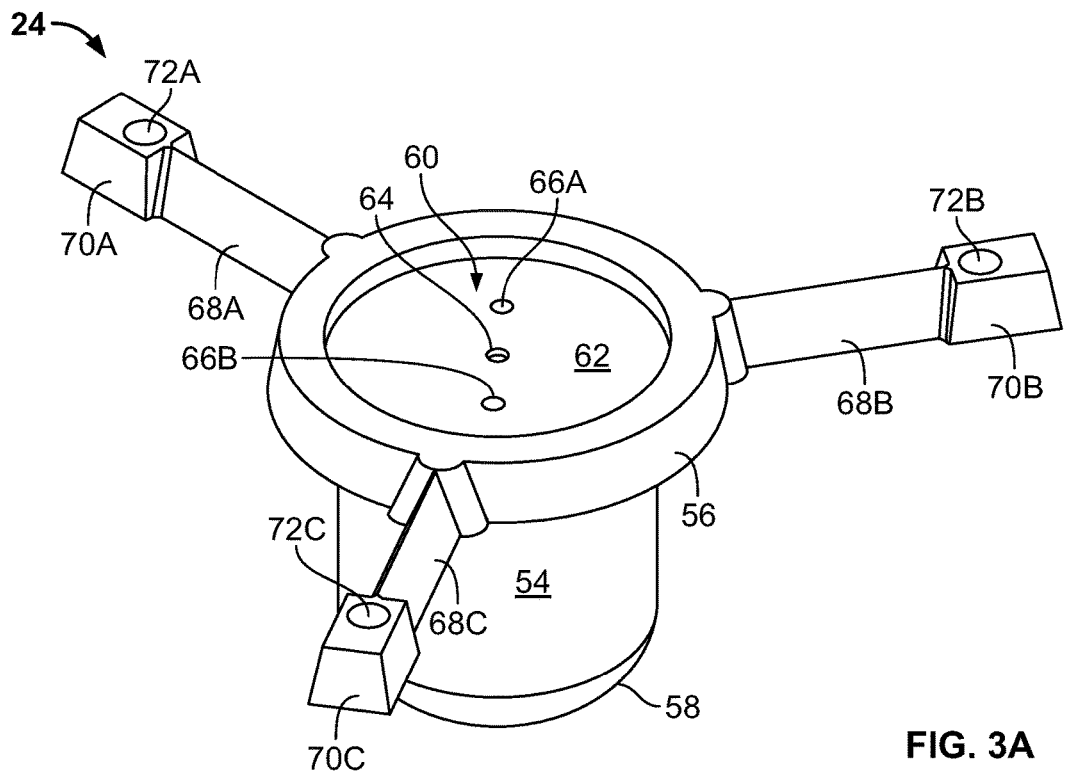
FIG. 3A is a top perspective view of the light module shown in FIG. 1, in accordance with one embodiment of the present invention.

Referring to FIG. 3A, in one embodiment, a security light includes a light module 24 having a central housing 54 with an upper end 56 and a lower end 58. The central housing 54 has a central depression 60 formed in the upper end 56. In one embodiment, the central depression 60 has a circular shape. The central depression 60 includes a floor 62 having a first opening 64 for passing electrical wiring therethrough and a pair of second openings 66A, 66B adapted for securing a light emitting diode module (not shown) over the floor 62 of the central depression 60.

The light module 24 also preferably includes support arms 68A, 68B, 68C that extend outwardly from the central housing 54. The outer ends of the arms 68A-6C preferably have mounting bases 70A-70C adapted to seat an underside of the hat 22 shown and described above in FIGS. 2A-2D.

Each of the mounting bases 70A-70C desirably has a opening 72A-72C extending therethrough. The openings 72A-72C are preferably adapted to receive threaded fasteners used for securing the hat (FIG. 2A) over the light module 24. In one embodiment, the openings 72A-72C may have internal threads.

Figure 3B:
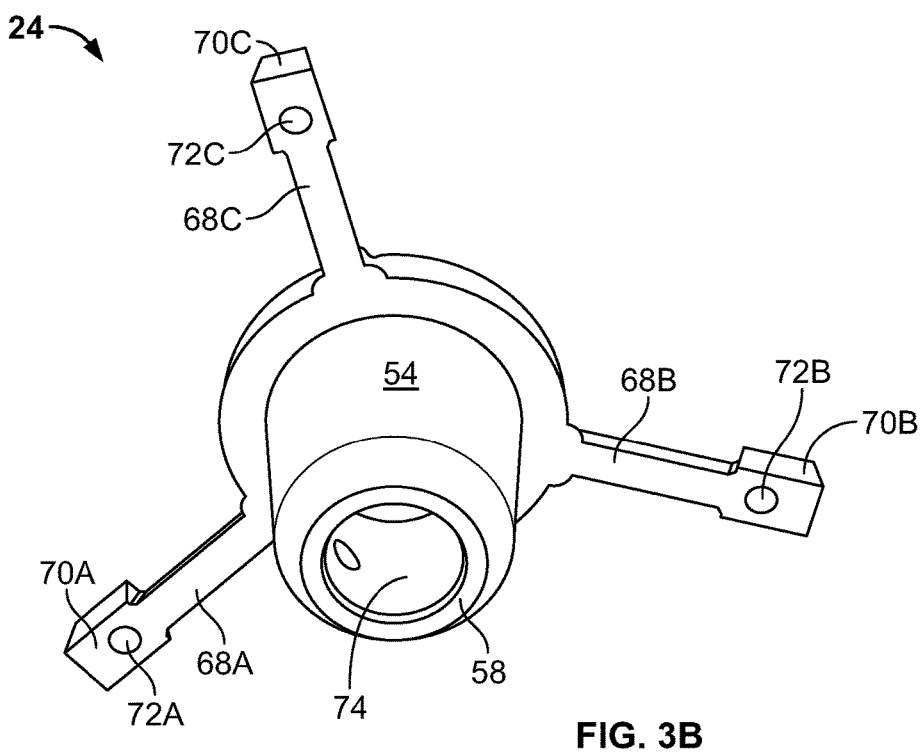
FIG. 3B is a bottom perspective view of the light module shown in FIG. 3A.

Referring to FIG. 3B, the openings 72A-72C extend completely through the respective mounting bases 70A-70C for being accessible at the underside of the arms 68A-68C. The lower end 58 of the central housing 54 preferably includes a central opening 74 adapted to receive an upper end of the extension tube 26 (FIG. 1), as will be described in more detail herein.

Referring to FIGS. 2B and 3B, in one embodiment, the hat 22 is secured to the light module 24 by aligning the threaded openings 44A-44C at the underside of the hat 22 with the respective openings 72A-72C at the ends of the support arms 68A-68C. The threaded fasteners (not shown) may be passed through the openings 72A-72C on the support arms 68A-680 and threaded into the threaded openings 44A-44C accessible at the underside of the hat 22.

Figure 3C:
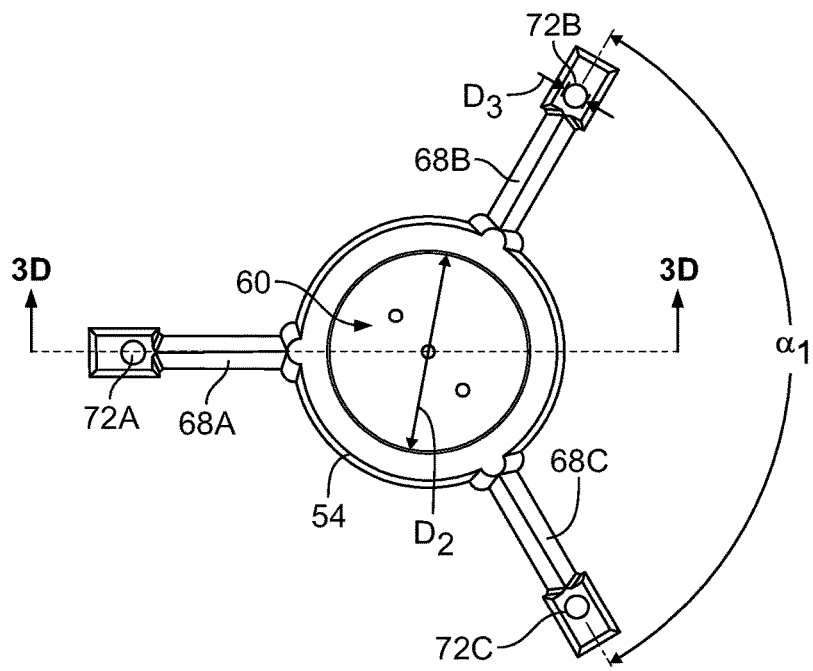
FIG. 3C is a top plan view of the light module shown in FIG. 3A.

Referring to FIG. 3C, in one embodiment, the support arms 68A-68C of the light module are evenly spaced from one another about the perimeter of the central housing 54. In one embodiment, adjacent support arms (e.g., 68B, 68C) define an angle $\alpha_1$ of about 120°. In an embodiment having four support arms, the angle between the adjacent support arms is preferably about 90°. The particular angle between adjacent support arms depends upon the number of support arms projecting outwardly from the central housing 54, with each support arm preferably being evenly spaced around the perimeter of the central housing 54.

In one embodiment, the central depression 60 formed in the upper end of the central housing 54 has a diameter $D_2$ of about 1-2 inches, and more preferably about 1.554 inches. The openings 72A-72C at the outer ends of the support arms 68A-68C preferably have a diameter $D_3$ of about 0.100-0.200, inches and more preferably about 0.188 inches.

Figure 3D:
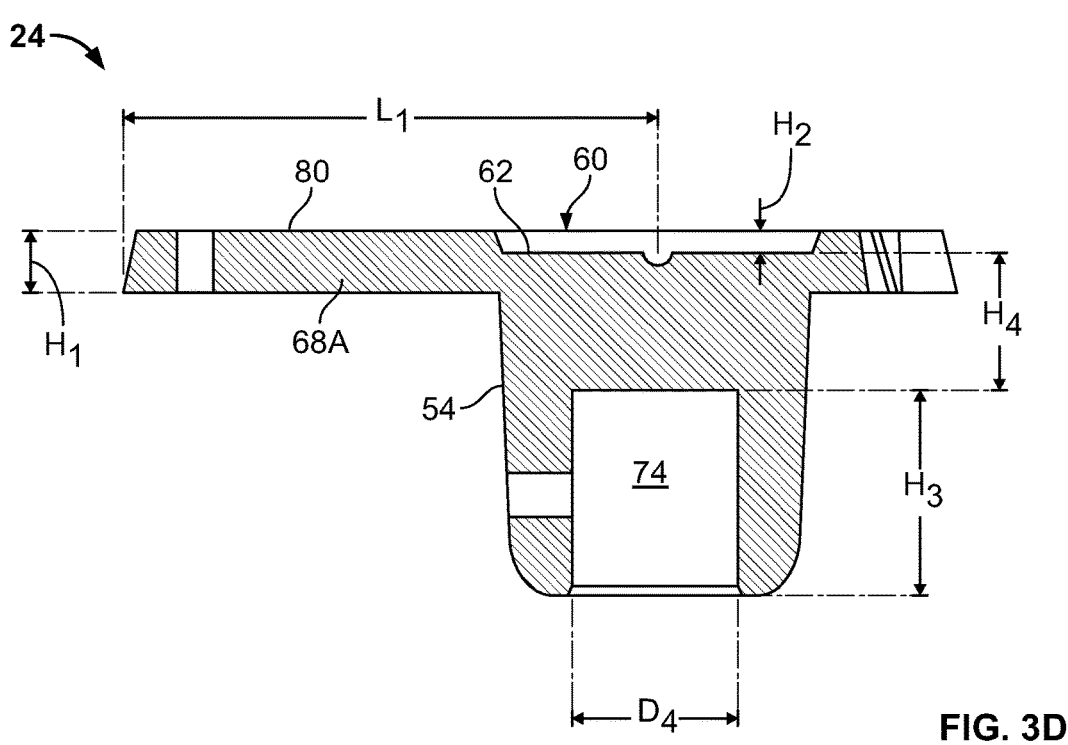
FIG. 3D is a cross-sectional view of the light module shown in FIG. 3C taken along line 3D-3D of FIG. 3C.

Referring to FIG. 3D, in one embodiment, the distance $L_1$ between a center of the central depression 60 and the outer end of the support arm 68A is about 2-3, inches and more preferably about 2.572 inches. The support arm 68A has a height $H_1$ of about 0.200-0.400 inches, and more preferably about 0.300 inches. The central depression 60 preferably includes the floor 62, which is sunken relative to a top surface 80 of the central housing 54. The distance between the floor 62 of the central depression 60 and the top surface 80 of the central housing 54 is designated $H_2$ and is about 0.050-0.150 inches, and more preferably about 0.100 inches.

The light module 24 also preferably includes the central opening 74 formed in the lower end 58 of the central housing 54. The central opening is adapted to receive an upper end of the extension tube 26 (FIG. 1). The central opening 74 preferably has a diameter $D_4$ of about 0.750-0.900 inches, and more preferably about 0.820 inches. The central opening 74 desirably has a height $H_3$ of about 0.750-1.250 inches, and more preferably about 1.000 inches. In one embodiment, the distance $H_4$ between the upper end of the central opening 74 and the floor 62 of the central depression 60 is about 0.500-0.750 inches, and more preferably about 0.667 inches.

Figure 4A:
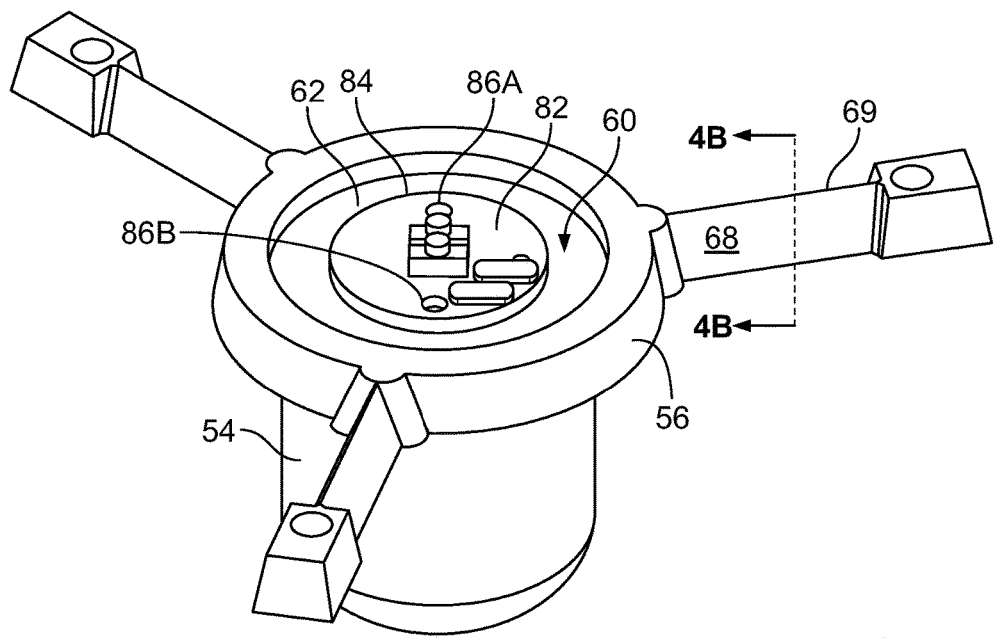
FIG. 4A is a top perspective view of the light module of FIG. 3A with a light emitting diode module secured atop the light module, in accordance with one embodiment of the present invention.

Referring to FIG. 4A, in one embodiment, a light emitting diode (LED) module 82 is secured to the floor 62 of the central depression 60 formed at the upper end of the central housing 54. The LED module 82 preferably includes a circuit board 84 having a pair of openings 86A, 86B extending therethrough. In one embodiment, the LED module 82 is secured to the floor 62 of the central depression 60 by aligning the openings 86A, 86B formed in the LED circuit board 84 with the openings 66A, 66B in the floor 62 of the central depression 60 (FIG. 3A). In one embodiment, the light emitting diode is covered in a molded borosilicate press glass lens that will protect the light emitting diode from the natural elements. In one embodiment, the lens is secured over the light emitting diode using silicone, such as RTV silicone.

Figure 4B:
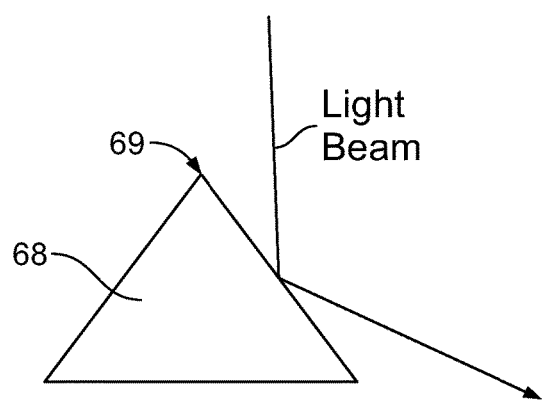
FIG. 4B is a cross-sectional view of a support arm of the light module of FIG. 4A taken along line 4B-4B of FIG. 4A.

Referring to FIGS. 4A and 4B, in one embodiment, the support arms 68 have a triangular shaped cross-section with an apex 69 that extends along the length of the support arm 68. The apex 69 of the support arm 68 defines an upper edge of the support arm that faces toward an underside of the hat for minimizing the surface area of the support arm that is capable of blocking light reflected downwardly by the underside of the hat. The support arm 68 desirably has a reflective coating for reflecting light that strikes the support arm 68.

Figure 5A:
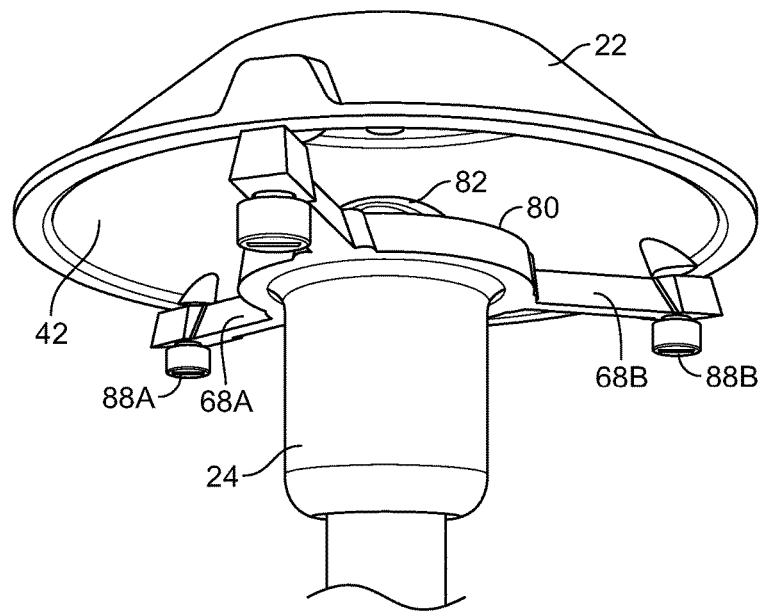
FIG. 5A is a bottom perspective view of the light module of FIG. 4A with the hat of FIGS. 2A-2D secured to support arms of the light module, in accordance with one embodiment of the present invention.
Figure 5B:
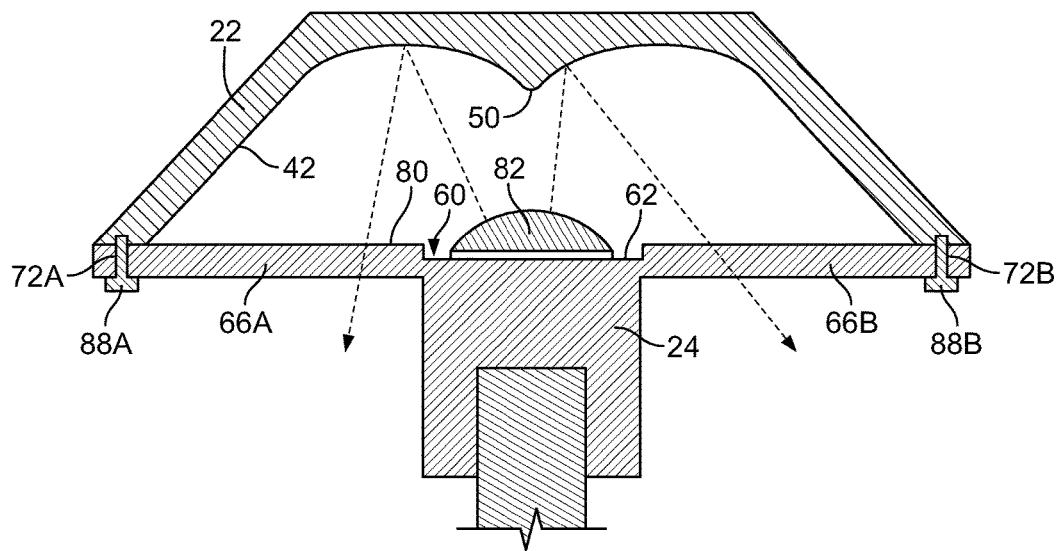
FIG. 5B is a cross-sectional view of the hat, the light module, and the light emitting diode module of FIG. 5A.

Referring to FIGS. 5A and 5B, in one embodiment, the hat 22 (FIGS. 2A-2D) is secured atop the light module 24. The double concave bottom surface 42 of the hat 22 preferably opposes the top surface 80 of the light module 24 and the LED module 82 secured to the floor 62 of the central depression 60. Threaded fasteners 88A-88C are preferably passed through the openings 72 formed in the respective support arms 68A-68C and threaded into the threaded openings provided in the underside of the hat 22 for securing the hat 22 to the support arms 68A-68C of the light module 24.

In one embodiment, after the hat 22 has been secured to the light module 24, the centrally located dimple 50 is desirably centered over the LED module 82. The double concave surface 42 desirably has a reflective coating that reflects the light generated by the LED module. In one embodiment, the light generated by the LED module 82 is reflected by the reflective coating on the double concave surface 42 and re-directed outwardly, in a downward direction. As a result, most, if not all of the light emanating from the security light disclosed herein is reflective light that is directed toward the ground. Thus, security cameras monitoring the security lights atop a perimeter fence will not encounter "hot spots" whereby direct light strikes the lens of a security camera, which may "blind" the security camera due to the intensity of the light. Reflecting the light toward the ground and minimizing direct light emanating from the security light greatly minimizes and/or eliminates "hot spots" to provide for better security monitoring when using security cameras or security personnel on site.

Figure 6A:
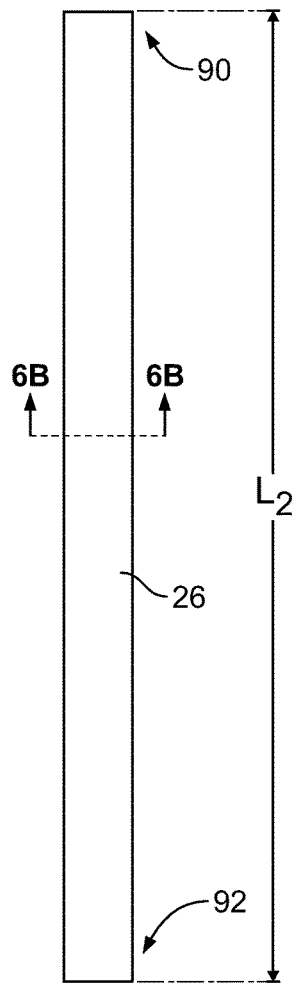
FIG. 6A is a front elevation view of the extension tube shown in FIG. 1, in accordance with one embodiment of the present invention.

Referring to FIG. 6A, in one embodiment, the security light includes an extension tube 26 having an upper end 90 adapted to be inserted into the central opening 74 at the lower end 58 of the central housing 54 of the light module 24 (FIG. 3B). The extension tube 26 also desirably includes a lower end 92 that is adapted to be assembled with the junction box 28 (FIG. 1), as will be described in more detail herein. In one embodiment, the extension tube 26 preferably has a length $L_2$ of about 6-24 inches, and more preferably about 18 inches. In one embodiment, the length of the extension tube may be modified and/or customized for a particular application.

Figure 6B:
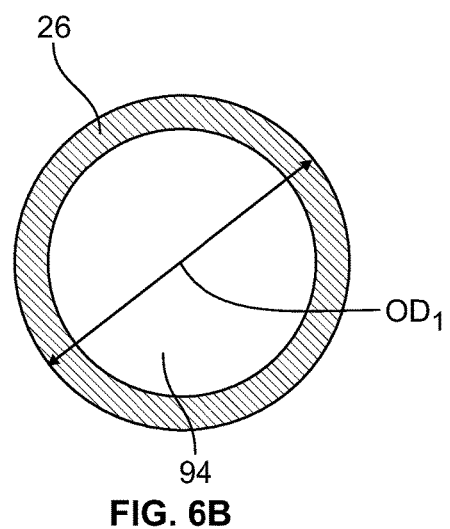
FIG. 6B is a cross-sectional view of the extension tube shown in FIG. 6A taken along line 6B-6B of FIG. 6A.

Referring to FIGS. 6A and 6B, in one embodiment, the extension tube 26 has an outer diameter $OD_1$ of about 0.800-0.900 inches, and more preferably about 0.858 inches. The extension tube 26 preferably has a central, elongated conduit 94 that extends from the upper end 90 to the lower end 92 thereof. The central, elongated conduit 94 is preferably adapted to receive electrical wiring for providing power to the LED module 82 mounted on the light module 24 (FIG. 5). In one embodiment, the extension tube 26 is preferably made of metal such as galvanized steel. In one embodiment, the upper end 90 of the extension tube 26 may have threads and the central opening 74 at the lower end 58 of the central housing 54 (FIG. 3B) may have opposing threads for securing the upper end of the extension tube with the light module. In one embodiment, the lower end 92 of the extension tube 26 may have threads for securing the lower end of the extension tube 26 to the junction box 28 (FIG. 1). In one embodiment, the upper end of the extension tube 26 may be secured to the central housing 54 using a socket and a set screw. In one embodiment, a lower end of the extension tube 54 may be secured to the junction box 28 using a socket and a set screw.

Figure 7A:
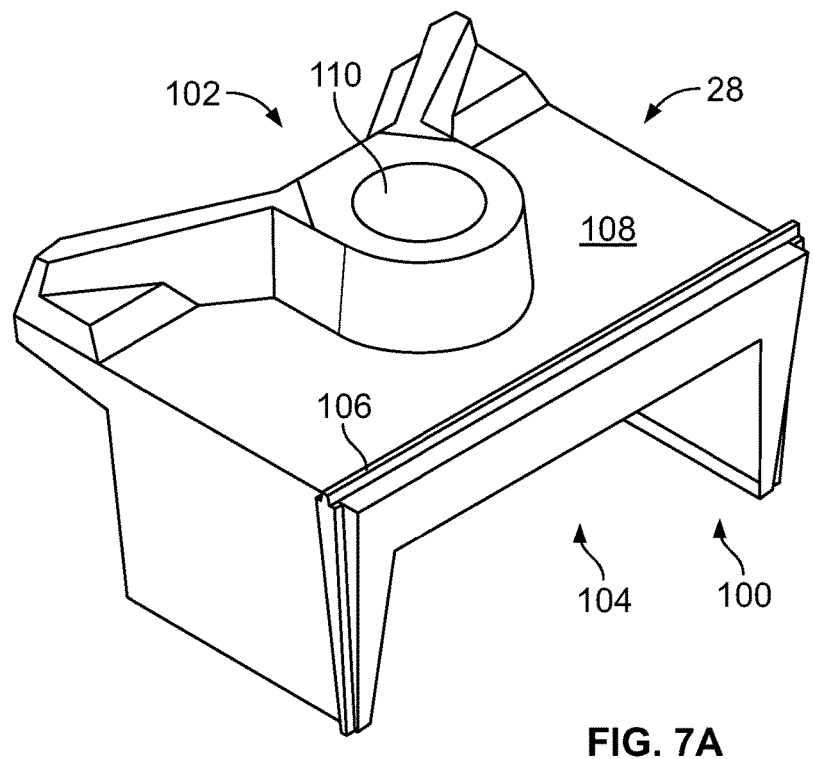
FIG. 7A is a top perspective view of the junction box shown in FIG. 1, in accordance with one embodiment of the present invention.

Referring to FIG. 7A, in one embodiment, a security light preferably includes a junction box 28 that is adapted to contain electrical components such as electrical wiring, circuit boards, and controllers used for providing electrical power to, and operating, the LED module. The junction box 28 preferably includes a front end 100 and a rear end 102. The front end 100 desirably includes a front opening 104 that provides access to an interior region of the junction box 28 for conducting electrical wiring operations. The front end 100 includes a ridge 106 that extends along an upper edge and two side edges of the front opening 104. The ridge 106 is preferably adapted to direct moisture, water and/or rain away from the front opening 104 for minimizing the likelihood that moisture, water and/or rain will enter the interior region of the junction box, which could damage the electrical components contained within the junction box 28.

The junction box 28 preferably includes a top wall 108 having a central opening 110 extending therethrough. The central opening 110 preferably extends through the top wall 108 for providing access to the interior region of the junction box 28.

Figure 7B:
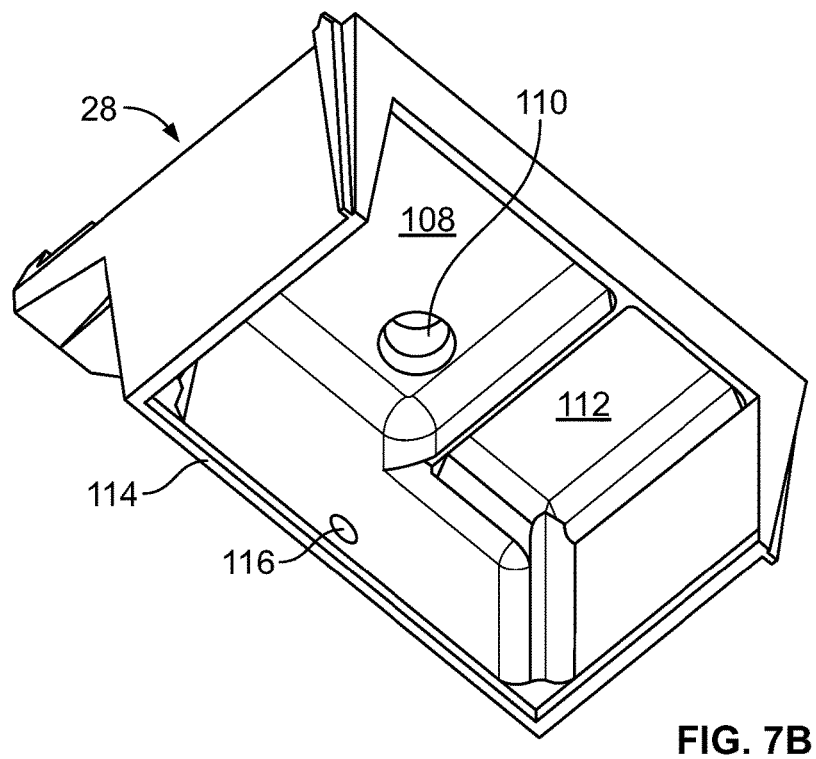
FIG. 7B is a bottom perspective view of the junction box shown in FIG. 7A.

FIG. 7B shows the central opening 110 extending through the top wall 108 and into the interior region of the junction box 28. The central opening 110 is adapted to receive the lower end 92 of the extension tube 26 (FIG. 6A). The central opening 110 may have internal threads adapted to engage opposing threads provided at the lower end of the extension tube for securing the lower end of the extension tube to the junction box 28. In one embodiment, the electrical components contained within the junction box 28 may be electrically interconnected with the LED module 82 (FIG. 4A) by passing electrical wiring through the central opening 110, the elongated conduit 94 of the extension tube 26 (FIG. 6B), through the central opening 64 provided at the lower end 58 of the central housing 54 of the light module 24 (FIG. 3B), and through the opening 64 in the floor 62 of the depression 60 at the upper end 56 of the central housing 54 (FIG. 3A).

Referring to FIG. 7B, in one embodiment, the junction box 28 desirably includes a heat sink 112 provided at an underside of the top wall 108. The heat sink 112 is preferably adapted to receive a circuit board or microprocessor used for controlling the LED module 82 (FIG. 4A) of the security light.

In one embodiment, the junction box 28 includes a vertically extending rear wall 114 that closes the rear end of the internal region of the junction box. The rear wall 114 preferably includes a threaded opening 116 extending therethrough that may be used for receiving a threaded shaft used for aligning the security light atop a vertical post of a fence. As will be described in more detail herein, a threaded alignment shaft may be passed through the threaded opening 116 for adjusting the angle and/or orientation of the junction box 28 relative to a vertical post upon which the security light is mounted. The alignment may be made when the security light is initially mounted atop the perimeter fence. The alignment may also be made after a period of time has passed from the initial mounting of the security light atop a perimeter fence.

Figure 7C:
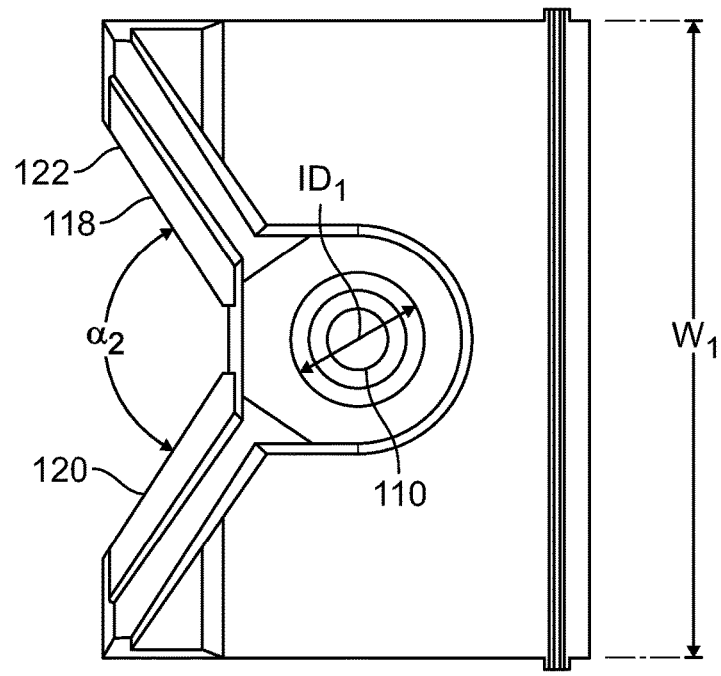
FIG. 7C is a top plan view of the junction box shown in FIG. 7A.

Referring to FIG. 7C, in one embodiment, the rear end 104 of the junction box 28 preferably includes a V-shaped securing flange 118 adapted to abut against an outer surface of a vertically extending post of a fence for securing the junction box atop or against the vertical post. The V-shaped securing flange 118 preferably has a first wing 120 and a second wing 122 that defines an angle $\alpha_2$ of about 100-120° and, more preferably 114.3°.

The junction box 28 preferably has a width $W_1$ of about 3.5-4.0 inches, and more preferably about 3.806 inches. The central opening 110 desirably has an inner diameter $ID_1$ of about 0.700-0.900 inches, and more preferably about 0.800 inches. The inner diameter $ID_1$ of the central opening 110 is preferably adapted to match the outer diameter $OD_1$ of the extension tube 26 (FIG. 6B).

Figure 7D:
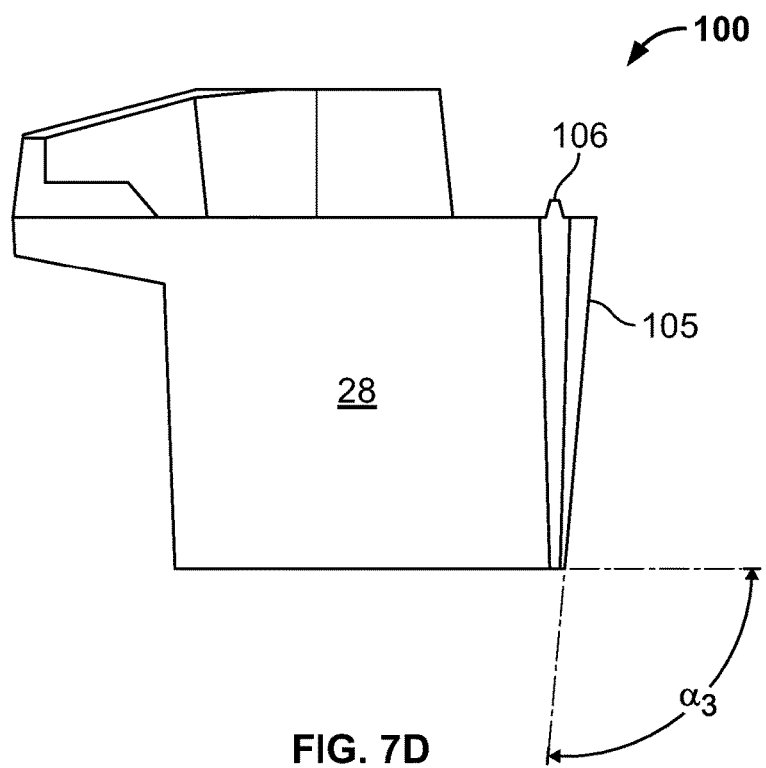
FIG. 7D is a left side view of the junction box shown in FIG. 7A.

Referring to FIG. 7D, in one embodiment, the front end 100 of the junction box 28 desirably includes the ridge 106 that extends around the upper edge and side edges of the front opening 104 (FIG. 7A). As described above, the ridge 106 is preferably adapted for preventing moisture, rain, and/or water from entering the internal region of the junction box 28 through the front opening 104 (FIG. 7A). A front face 105 at the front end 100 of the junction box 28 preferably forms an angle $\alpha_3$ with a bottom edge 120 of the junction box 28 of about 92-98° and more preferably about 95°. The angled front face 105 works in conjunction with the ridge 106 to prevent moisture, water and/or rain from entering the internal region of the junction box 28.

Figure 8A:
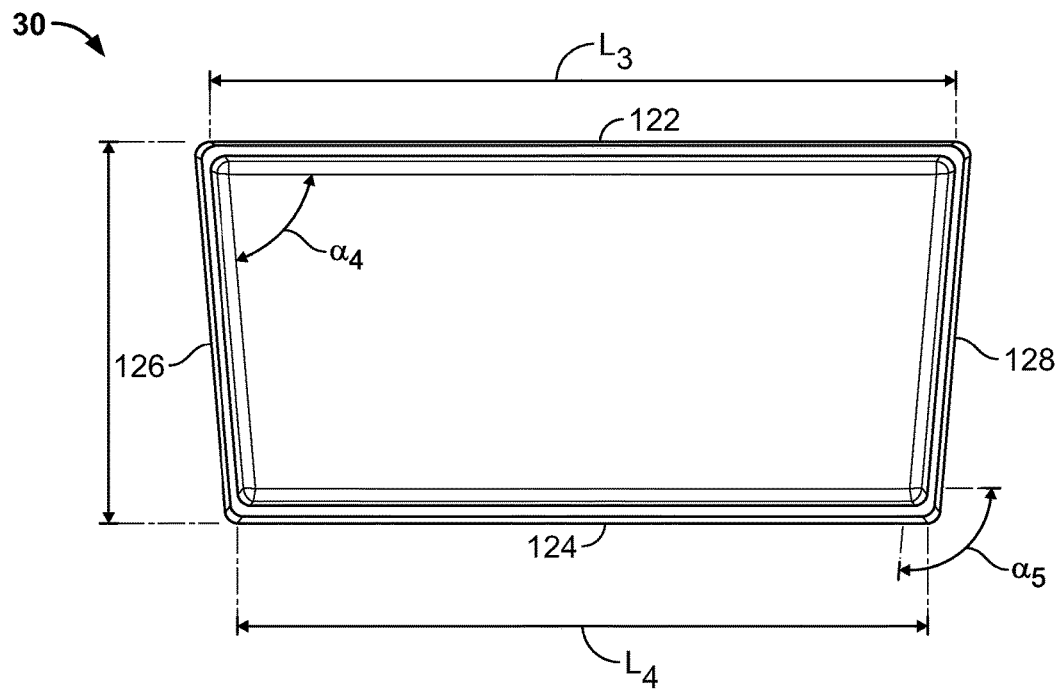
FIG. 8A is a front elevation view of the front cover plate shown in FIG. 1, in accordance with one embodiment of the present invention.

Referring to FIG. 8A, in one embodiment, the security light preferably includes a front cover plate 30 that is adapted to be assembled with the junction box 28 for covering the front opening 104 at the front end 100 of the junction box 28 (FIG. 7A). The front cover plate 30 desirably has an upper edge 122 having a length $L_3$ of about 4-5 inches, and more preferably about 4.201 inches, a lower edge 124 having a length $L_4$ of about 3.5-4 inches, and more preferably about 3.790 inches, and first and second side edges 126, 128 each having a length $L_5$ of about 2.0-2.25 inches, and more preferably about 2.129 inches. The side edges 126, 128 extend inwardly between the upper edge 122 and the lower edge 124. The inward slope preferably defines an angle $\alpha_4$ of less than 90°, and more preferably about 85°. The front face of the front cover plate 30 defines an angle $\alpha_5$ that matches the angle $\alpha_3$ of the front face 100 of the junction box 28 (FIG. 7D), which is about 92-98°, and more preferably about 95°.

Figure 8B:
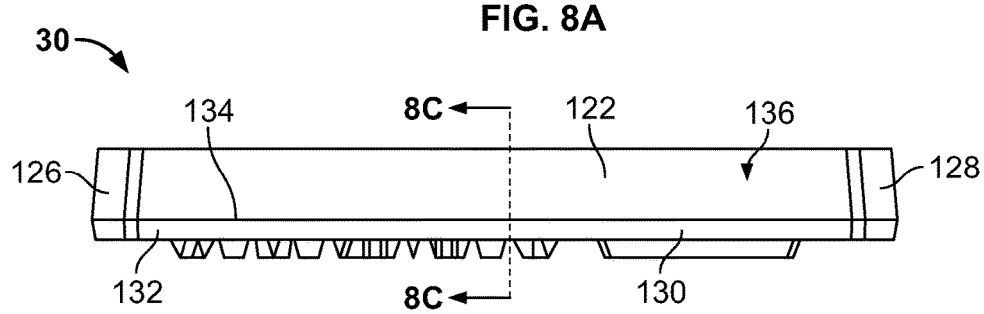
FIG. 8B is a top plan view of the front cover plate shown in FIG. 8A.

Referring to FIG. 8B, the front cover plate 30 includes the front wall 130 having an outer surface 132 and an inner surface 134. The front cover plate 30 also desirably includes side edges 126 and 128 that extend downwardly from the upper edge 122 (FIG. 8A). The front wall 130, the upper edge 122, the lower edge 124 and the side edges 126, 128 define a pocket 136 adapted to cover the front opening 104 of the junction box 28 (FIG. 7A). In one embodiment, the pocket 136 is adapted to receive the ridge 106 extending around the perimeter of the front opening 104 of the junction box 28 (FIG. 7A).

Figure 8C:
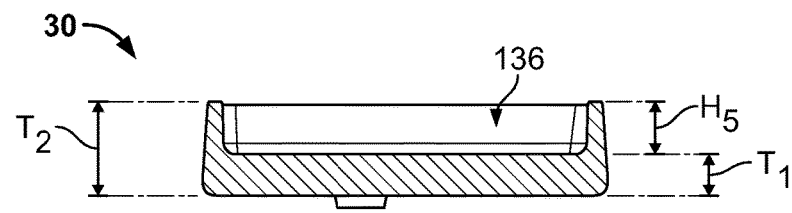
FIG. 8C is a cross-sectional view of the front cover plate of FIG. 8B taken along line 8C-8C of FIG. 8B.

Referring to FIG. 8C, the pocket 136 of the front cover plate 30 has a depth $H_5$ of about 0.250-0.300 inches, and more preferably about 0.275 inches. The front wall 130 has a thickness $T_1$ of about 0.175-0.225 inches, and more preferably about 0.200 inches. The distance T2 between the front face 132 and the rear edge of the side edges 126, 128 is about 0.475 inches.

Referring to FIGS. 9A-9D, in one embodiment, the security light preferably includes a bottom cover plate 32 that is adapted to cover a bottom opening of the junction box 28 (FIG. 7B). The bottom cover plate 32 desirably includes a bottom wall 140 having a central opening 142 extending therethrough for providing access to an interior region of the junction box after the bottom cover plate 32 has been assembled with the junction box. The bottom cover plate 32 preferably includes a first support flange 144 extending upwardly from a left side of the bottom wall 140, and a second support flange 145 extending upwardly from a right side of the bottom wall 140. In one embodiment, the first support flange 144 has a first wire channel 146 formed therein, which provides a strain relief for electrical wiring directed into the junction box. The first wire channel 146 also enables the electrical wiring to be brought into the bottom of the junction box for making the junction box more water resistant. The second support flange 145 has a second wire channel 147 that performs the same functions as the first wire channel 146. The bottom cover plate 32 also desirably includes a rear support flange 148 that extends upwardly from a rear edge of the bottom wall 140. In one embodiment, the central opening 142 formed in the bottom wall 140 defines a diameter $D_5$ of about 0.8-0.9 inches, and more preferably about 0.847 inches.

Figure 9A:
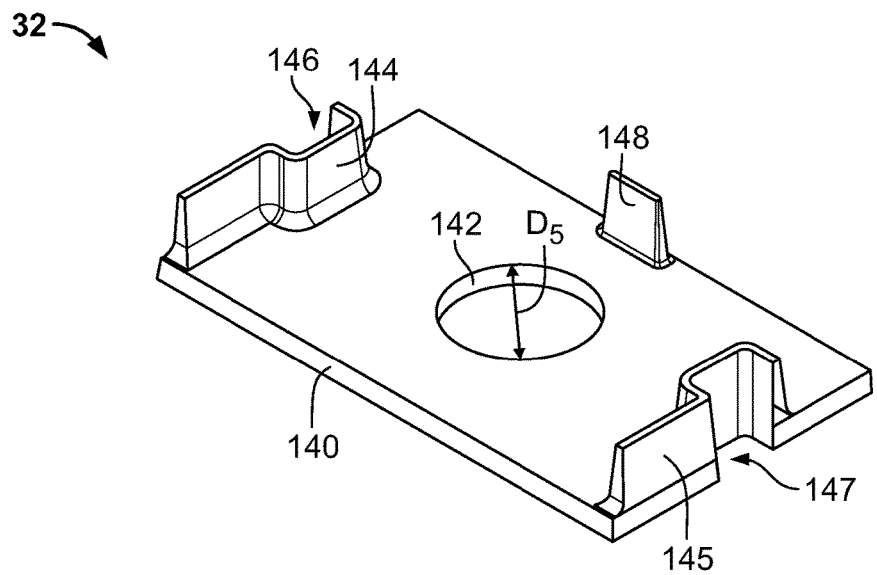
FIG. 9A is a top plan view of the bottom cover plate shown in FIG. 1, in accordance with one embodiment of the present invention.
Figure 9B:
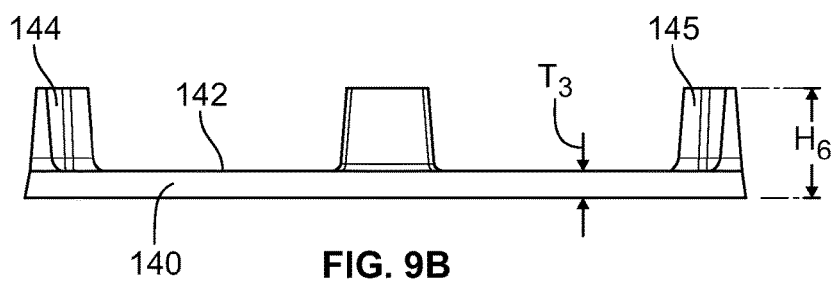
FIG. 9B is a front elevation view of the bottom cover plate shown in FIG. 9A.

Referring to FIG. 9B, in one embodiment, the bottom wall 140 desirably has a thickness $T_3$ of about 0.125 inches. The support flanges 144, 145, 148 have a height $H_6$ of about 0.500 inches relative to a top surface 142 of the bottom wall 140.

Figure 9C:
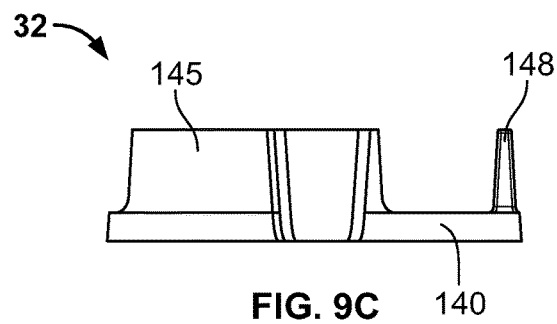
FIG. 9C is a right side view of the bottom cover plate shown in FIG. 9A.

FIG. 9C shows the rear support flange 148 projecting upwardly from a rear edge of the bottom wall 140. The right support flange 145 projects upwardly from a right side of the bottom wall 140. The bottom cover plate 32 is adapted to be assembled with the junction box 28 for covering the bottom opening of the junction box. If it is necessary to obtain access to an internal region of the junction box 28 for wiring, maintenance and/or repair operations, the bottom cover plate 32 is adapted to be selectively removed from its assembly with the junction box.

Figure 10A:
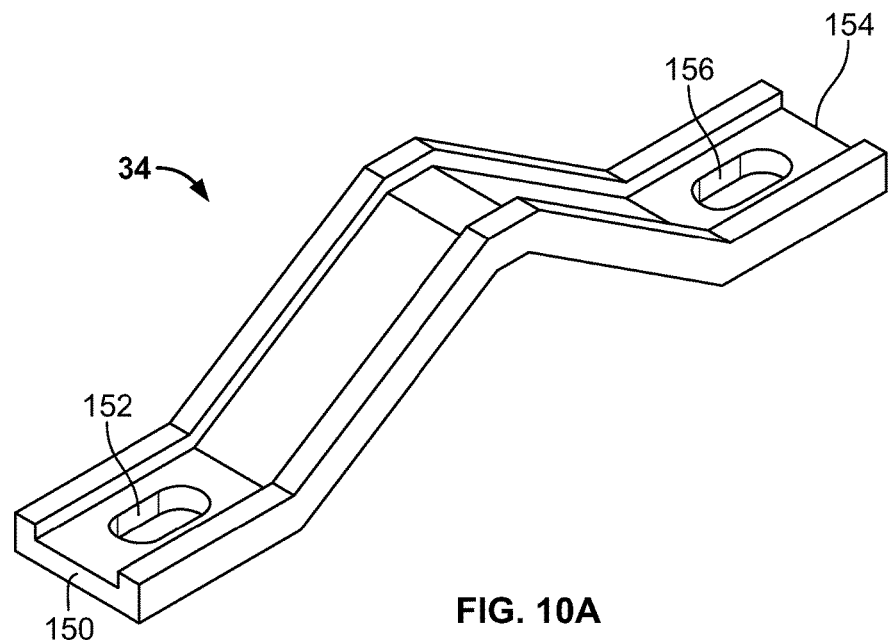
FIG. 10A is a top perspective view of the securing bracket shown in FIG. 1, in accordance with one embodiment of the present invention.

Referring to FIG. 10A, in one embodiment, the security light preferably includes a securing bracket 34 that is assembled with threaded bolts 36A, 36B projecting from a rear of the junction box 28 (FIG. 1). The securing bracket 34 preferably has a first end 150 having a first elongated opening 152 and a second end 154 having a second elongated opening 156. The securing bracket 34 is coupled with the threaded bolts by passing the threaded bolts through the elongated openings 152, 156.

Figure 10B:
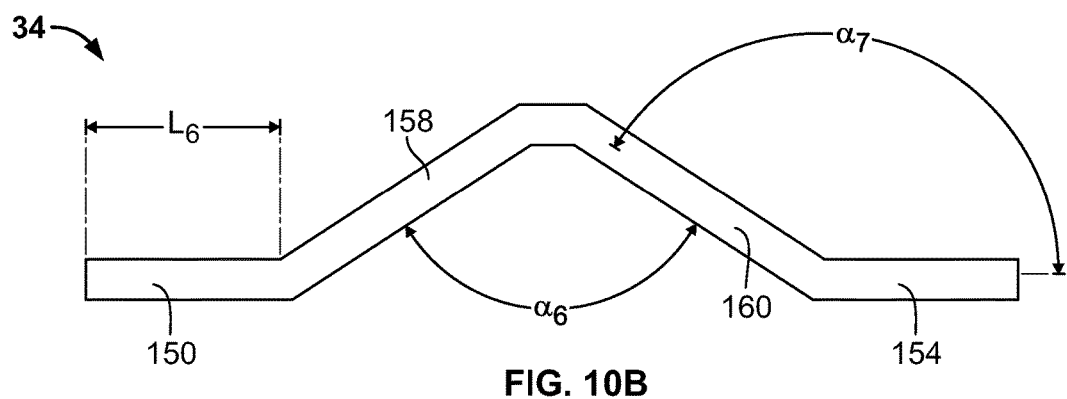
FIG. 10B is a front elevation view of the securing bracket shown in FIG. 10A.

Referring to FIG. 10B, in one embodiment, the securing bracket 34 has a V-shaped central region including a first wing 158 and a second wing 160. The first and second wings define an angle $\alpha_6$ of about 110-120°, and more preferably about 114.3°. The first and second ends 150. 154 of the securing bracket 34 include flat sections that define an angle $\alpha_7$ with the respective wings 158, 160 of about 140-155°, and more preferably about 147.2°. The flat sections 150, 154 preferably have a length $L_6$ of about 0.9-1.0 inches, and more preferably about 0.954 inches.

Figure 11:
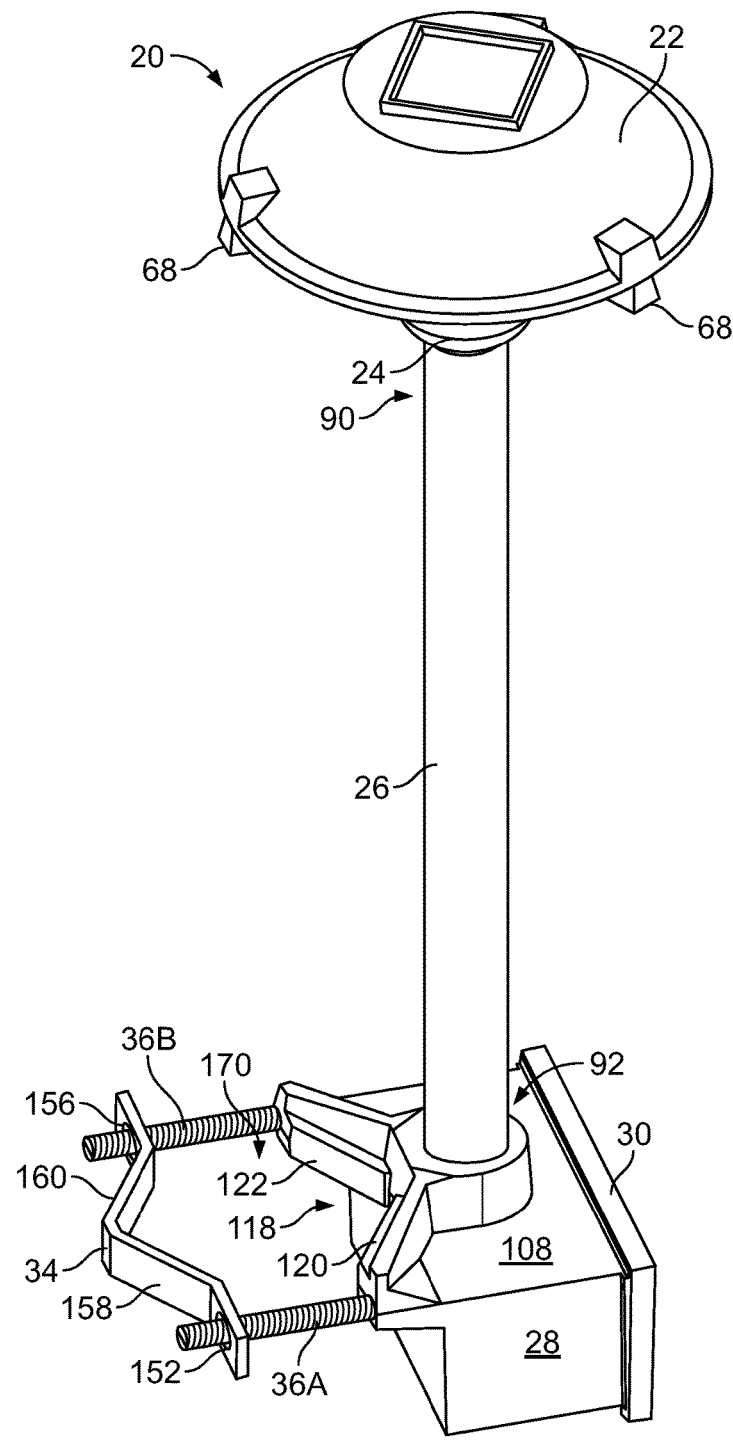
FIG. 11 is a perspective view of a security light for a perimeter fence, in accordance with one embodiment of the present invention.

Referring to FIG. 11, in one embodiment, the securing bracket 34 is assembled with the threaded bolts 36A, 36B projecting from the junction box 28 by passing the threaded bolts 36A, 36B through the elongated openings 152, 156 of the securing bracket 34. The V-shaped opening between the wings 158, 160 of the securing bracket 34 preferably faces the V-shaped opening formed between the wings 120, 122 of the V-shaped flange 118 at the rear end of the junction box 28.

In one embodiment, the security light 20 is adapted to be mounted atop a vertical post of a fence by passing an upper end of the vertical post through a diamond shaped opening 170 defined by the V-shaped flange 118 at the rear of the junction box 28 and the V-shaped securing bracket 34. A clamping force may be generated between the securing bracket 34 and the rear of the junction box 28 by tightening threaded fasteners onto the ends of the threaded bolts 36A, 36B.

In FIG. 11, the hat 22 is secured atop the light module 24 by aligning the openings at the outer ends of the support arms 68 with the threaded openings 44A-44C provided at the underside of the hat 22 (FIG. 2B). Threaded fasteners may be passed through the aligned openings for securing the hat 22 atop the light module 24.

The extension tube 26 has the upper end 90 thereof inserted into the central opening provided at the underside of the central housing of the light module 24, and a lower end 92 of the extension tube 26 is inserted into the central opening provided in the top wall 108 of the junction box 28. The front cover plate 30 is assembled with the junction box 28 for covering the front opening of the junction box.

Figure 12:
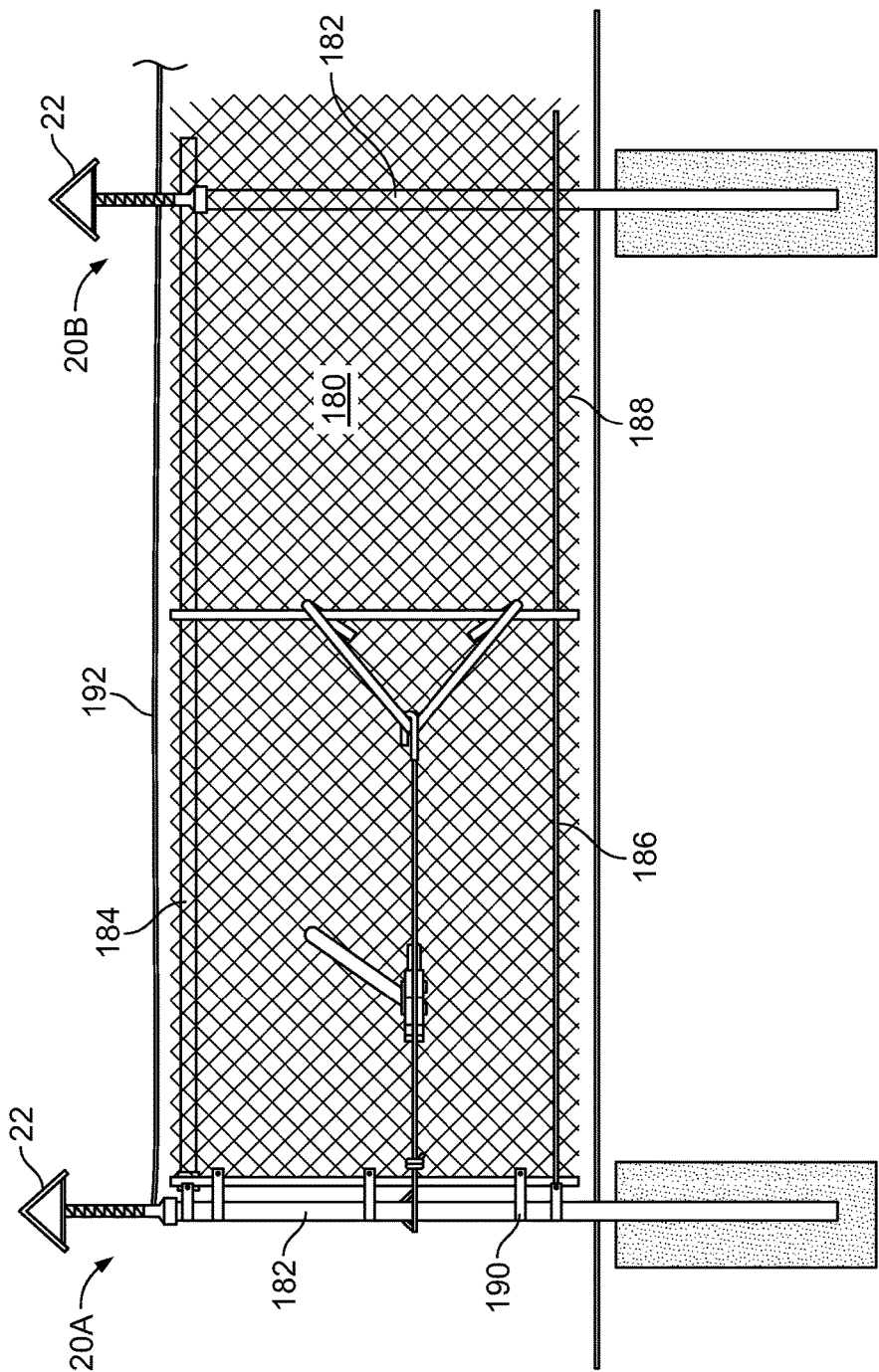
FIG. 12 shows a fence having security lights mounted atop vertical posts of the fence, in accordance with one embodiment of the present invention.

Referring to FIG. 12, in one embodiment, one or more security lights 20A-20B may be assembled atop a fence 180 having vertical support posts 182. In one embodiment, the fence 180 is a chain link fence including the vertical support posts 182, a top support rail 184, a bottom support member 186, and chain link 188 secured to the vertical posts 182 using chain link fasteners 190.

In one embodiment, the diamond shaped opening 170 between the V-shaped flange at the rear end of the junction box 28 and the V-shaped securing bracket 34 (FIG. 11) is preferably passed over the upper end of the vertical post 182. The securing bracket may then be slid along the threaded bolts toward the rear end of the junction box for clamping the vertical post between the securing bracket and the rear end of the junction box. Locking nuts may be passed over the threaded shafts 36A, 36B and tightened for securing the junction box atop or against the vertical post.

Figure 13:
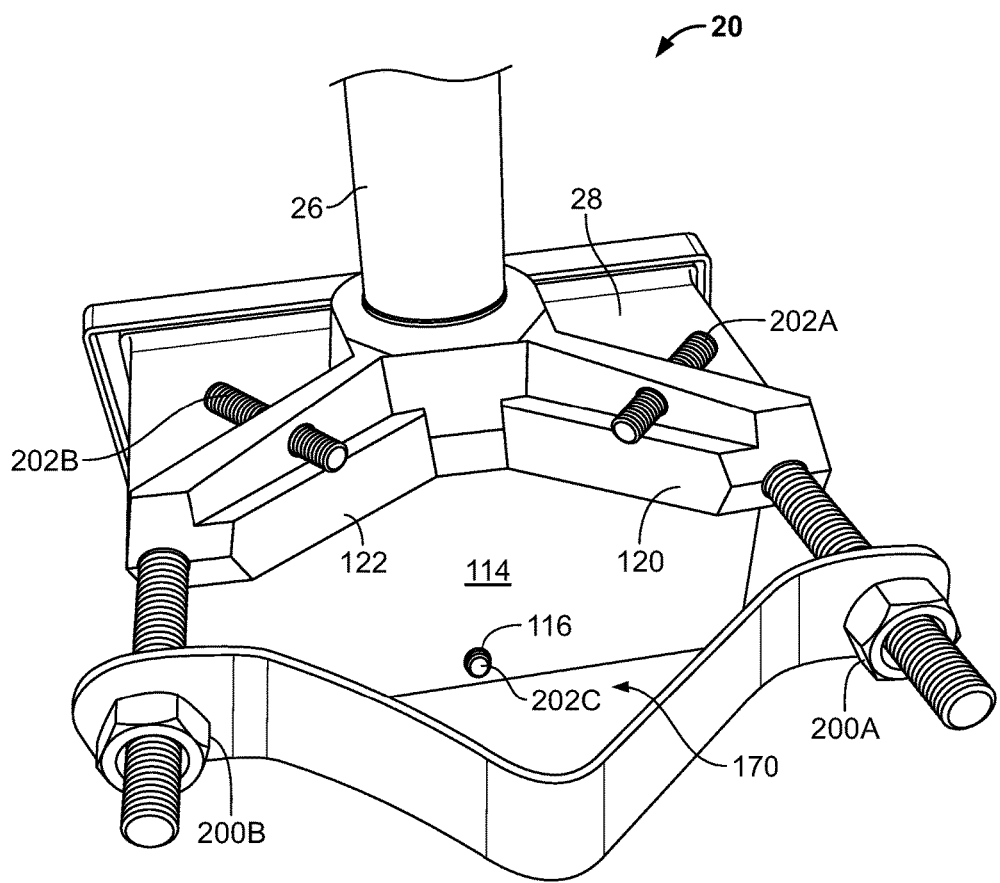
FIG. 13 shows a lower end of a security light including a junction box and a saddle style clamp for securing the security light to a vertical post of a fence, and an alignment system for aligning the security light atop the vertical post, in accordance with one embodiment of the present invention.

Referring to FIG. 13, in one embodiment, the security light 20 preferably includes an alignment system for properly aligning the security light atop or against a vertical post of a fence. For example, it may be necessary to use the alignment system to insure that the longitudinal axis of the extension tube 26 is parallel with the longitudinal axis of the vertical post to which the security light 20 is attached. In one embodiment, after a vertical post has been inserted into the diamond-shaped opening 170 between the securing bracket 34 and the wings 120, 122 of the V-shaped flange 118 at the rear end of the junction box 28, locking nuts 200A, 200B may then be tightened for clamping the junction box 28 onto the vertical post.

In one embodiment, the alignment system preferably includes a set of alignment elements 202A, 202B, 202C that extend into the diamond-shaped opening 170. In one embodiment, a first alignment element 202A is a threaded shaft that extends through a first threaded opening in the first wing 120, and a second alignment element 202B is a threaded shaft that extends through a second threaded opening in the second wing 122. The alignment system preferable includes a third alignment element 202C that extends through the threaded opening 116 in the rear wall 114 of the junction box 28. The three alignment elements 202A-202C may function as a tripod-like alignment mechanism for insuring that the longitudinal axis of the extension tube 26 is aligned with the longitudinal axis of the vertical post on the fence. Once the extension tube 26 has been properly aligned using the alignment system, the locking nuts 200A and 200B may be further tightened for securing the security light to the vertical post. In one embodiment, a properly aligned security light has an extension tube that extends along an axis that is parallel to a vertical post and perpendicular to the ground, with the support arms 68 of the light module 24 extending parallel to the ground (FIG. 5A). The alignment process may be repeated for the other security lights in the security lighting system to insure that all of the security lights are properly aligned atop the respective vertical posts of the fence.

Referring to FIG. 12, the security lights 20A-20B are preferably connected to an electrical circuit using electrically conductive wire 192 that interconnects the security lights 20A-20B to a circuit. In operation, the LED modules of the security lights 20A-20B generate light that is reflected downwardly and outwardly by the reflective coating on the underside of the hats 22. As a result, the light is reflected downward toward the fence 180 and the ground 194. In FIG. 12, a security light 20 is mounted atop each of the vertical posts 182 of the fence 180. In other embodiments, however, the spacing between the security lights 20A-20B may be increased. For example, in one embodiment, a security light may be mounted atop every second vertically extending support post 182. In another embodiment, a security light may be mounted atop every third vertically extending support post 182. The spacing between the security lights 20A-20B depends on local factors including the geographic area, local weather conditions and the level of the security risk.

Figure 14:
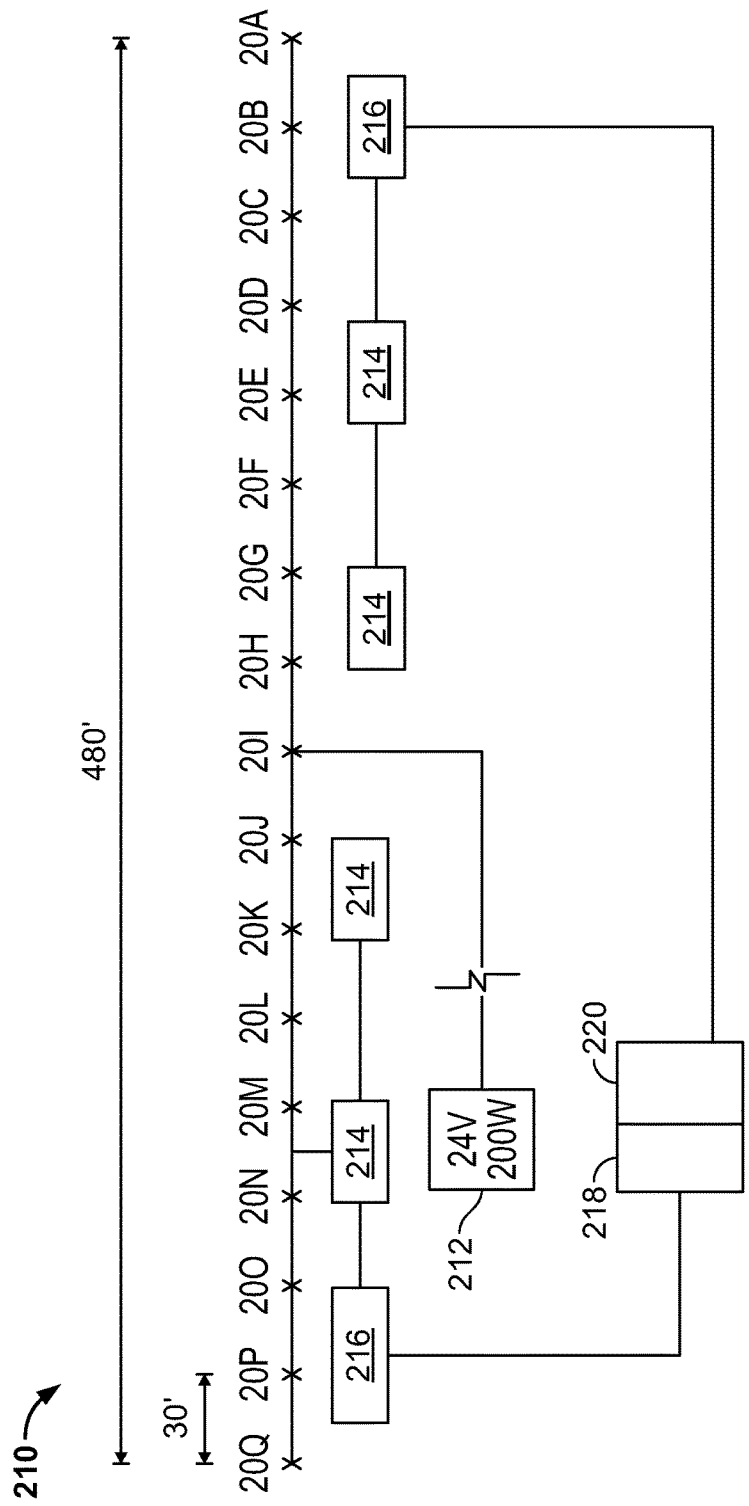
FIG. 14 shows a schematic diagram of a security lighting system for a perimeter fence, in accordance with one embodiment of the present invention.

Referring to FIG. 14, in one embodiment, a security lighting system 210 for a fence preferably includes a plurality of individual security lights 20A-20Q. In one embodiment, a plurality of security lights 20A-20Q are secured on respective fence posts that are spaced 30' from one another for providing security lighting for a fence have a total length of 480'. In other embodiments, a security light may be placed on every other post, every third post, etc., depending upon the environment and the security needs. The security lights 20A-20Q are electrically interconnected using electrical wiring and are coupled with a low-voltage transformer 212 that provides sufficient power to illuminate the LED units. The low-voltage transformer may have a direct current or an alternating current output.

In one embodiment, the security lighting system 210 may have one or more motion sensors 214 that are adapted to activate all of the security lights 20A-20Q of the lighting system. In one embodiment, the motion sensors may activate only one or a smaller group of security lights that cover a particular area of the fence, as designated by an installer. In one embodiment, a security lighting system for a fence may include one or more remote cameras 216 for monitoring the fence. The lighting system may include a video recording system 218 for storing video recorded by the remote cameras. In one embodiment, the security lighting system may include a microprocessor 220 for controlling operation of the security lights 20A-20Q, the motion sensors 214, the remote cameras 216, and the video recording system 218 of the security lighting system 210.

Figure 15:
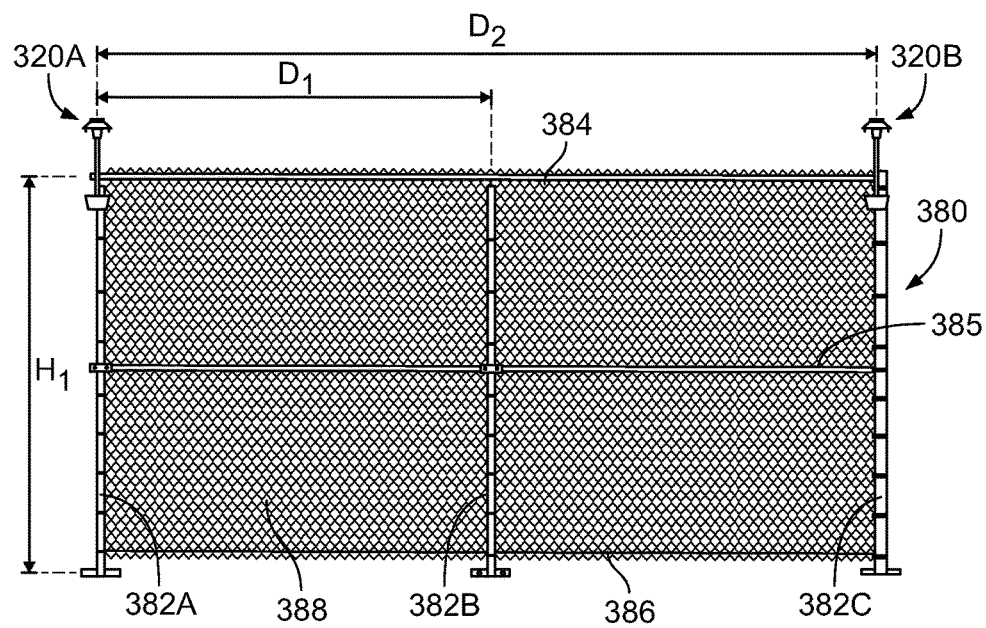
FIG. 15 shows a fence having vertical support posts and security lights mounted onto the vertical support posts, in accordance with one embodiment of the present invention.

Referring to FIG. 15, in one embodiment, a fence 380, such as a perimeter security fence, includes vertical support posts 382A, 382B and 382C, a top horizontal fence pipe 384, a middle horizontal fence pipe 385, and a bottom horizontal fence pipe 386. The fence 380 also includes chain link 388 that is secured to the vertical support posts and the horizontally extending fence pipes 384, 385, 386. Each vertical support post has a height designated $H_1$. The vertical support posts have a fence post spacing designated $D_1$. The security fence has security lights 320A, 320B, such as the low voltage security lights disclosed herein, which are mounted to every second vertical support post 382. The distance between the adjacent security lights 320 defines a security light spacing distance designed $D_2$.

In one embodiment, each one of the security lights is mounted on one of the respective vertical support posts. In one embodiment, the security lights are mounted at the top or upper end of each of the vertical support posts. The spacing between the adjacent security lights is dependent upon the particular security and/or illumination requirements. In one embodiment, a security light may be mounted on every second vertical support post, however, higher or lower illumination requirements may necessitate mounting a security light at different spacing intervals, e.g., every vertical support post, every third vertical support post, etc. In one embodiment, the level of illuminance produced by the security lighting system is dependent upon both the spacing between adjacent security lights and the fence height.

In one embodiment, the security lighting system disclosed herein is designed to provide low-glare, low-level illuminance for long fence lines. This security lighting system utilizes low voltage security lights having LED lights, which maximizes energy efficiency and eliminates disabling glare for guards and cameras while providing sufficient illumination for intruder and vandal detection. Although the present invention is not limited by any particular theory of operation, it is believed that low-glare, low-level illuminance provides a number of advantages including minimal contrast and no disabling glare. Regarding minimal contrast, when lit areas and un-lit areas are near in illuminance values, intruders are more easily detected when moving between the two areas. Guards and cameras are able to readily adjust vision or exposure between the lit and un-lit areas. Regarding no disabling glare, overly bright or direct light sources temporarily blind guards and, for cameras, cause internal reflections and inappropriate exposure compensation. The low-glare lighting provided by the security lighting system disclosed herein is ideal for detection.

Figure 16:
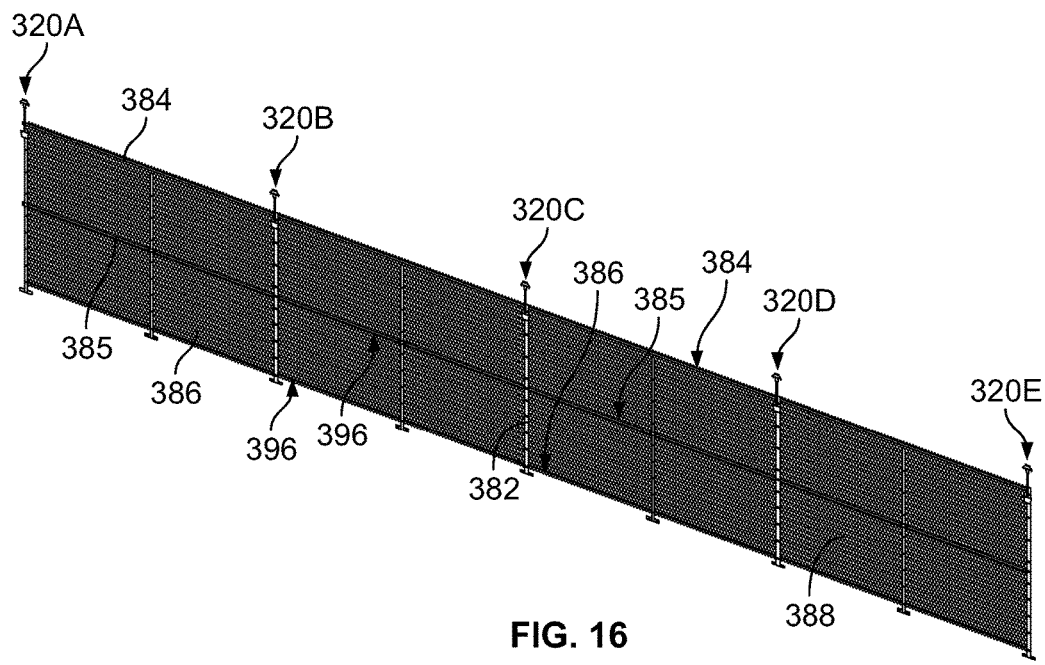
FIG. 16 shows a perspective view of a fence having security lights affixed to every other vertical support post, in accordance with one embodiment of the present invention.

Referring to FIG. 16, in one embodiment, a security lighting system is mounted to a fence 380. Electrically conductive wiring is used to provide power to the security lights 320A-320E mounted onto the fence. In one embodiment, the electrically conductive wiring is low voltage wiring that is weatherproof and UV-rated so that the conductive wiring may be attached directly to the components of the fence 380 without the use of protective conduit. In one embodiment, the low voltage electrically conductive wires may be attached directly to the fence using fasteners such as permanent or removable cable ties. The electrically conductive wires may be strung along the top horizontal fence pipe 384, the middle horizontal fence pipe 385, or the bottom horizontal fence pipe 386 to reach the location of the security lights 380A-380E. In one embodiment, the electrically conductive wiring is attached directly to the horizontal fence pipes, which provides a system that is relatively safe from vandals since it is difficult to reach through the chain link 388 to attack the conductive wires.

In one embodiment, conduit 396 may be used for higher-security applications for protecting the electrically conductive wire from vandals and/or the weather. In one embodiment, the conduit 396 may be PVC or metal conduit such as ½" inch PVC or metal conduit. In one embodiment, the conduit 396 is strung along one of the horizontal fence pipes such as the middle horizontal fence pipe 385 or the bottom horizontal fence pipe 386. In one embodiment, a junction box of a security light is mounted onto a vertical support post 382 and a vertically extending conduit connects the electrically conductive wiring within the horizontally extending conduit to the junction box.

In one embodiment, for optimal energy efficiency, a transformer is mounted as close to the fence 380 as possible. In one embodiment, however, longer runs between the fence and the transformer are acceptable. The transformer may be mounted indoors or outdoors. Outdoor installation may be accomplished by mounting the transformer to the side of a building, on the fence itself, or by using a transformer mounting stand.

Figure 17:
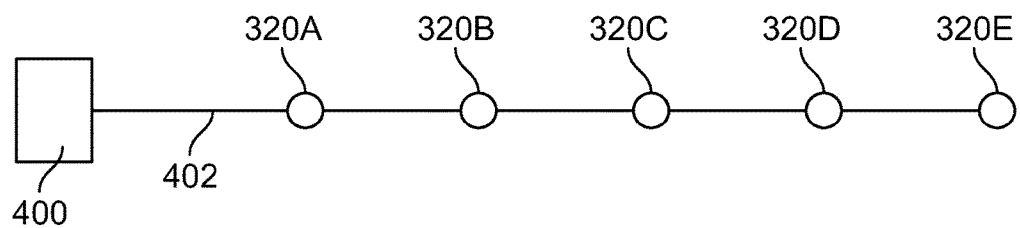
FIG. 17 shows a daisy chain wiring structure for security lighting system, in accordance with one embodiment of the present invention.

Referring to FIG. 17, in one embodiment, a security lighting system includes a daisy chain wiring run that is utilized for connecting the security lights 320A-320E to a transformer. In one embodiment, each of the security lights 320A-320E is mounted on to a vertical support post of a fence. A transformer 400 is utilized for transforming high voltage power to a low-voltage output of about 12-24V AV or 12-24V DC. A home run wire 402 extends between the transformer 400 and the first security light 320A. Low voltage electrically conductive wires connect each subsequent security light 320B-320E. The daisy chain wiring run provides a number of benefits including using less wire and requiring less installation time. Although only five security lights are shown in FIG. 17, lighting systems may include 20, 30 or more security lights.

Figure 18:
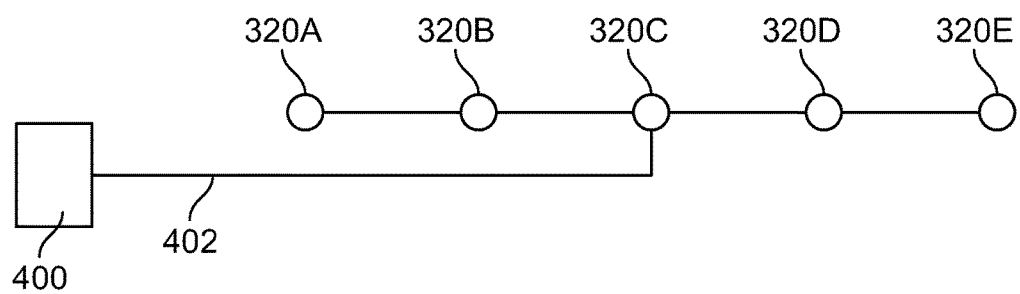
FIG. 18 shows a T-method wiring system for security lighting system, in accordance with another embodiment of the present invention.

Referring to FIG. 18, in one embodiment, a T-method wiring run may be utilized for providing power to the security lights 320A-320E. The lighting system includes a transformer 400 having a home run wire 402 that extends between the transformer and a middle security light 320C. Low voltage electrical wiring 404 extends to the left and to the right of the central security light 320C to provide power to the remaining security lights in the system. The center security light 320C may be referred to as a "junction" security light with security lights 320A, 320B being on a left leg and security lights 320D, 320E being on a right leg. The T-method wiring run provides a number of benefits includes less voltage loss and more security lights that may be run on a chain. Although only five security lights are shown in FIG. 18, lighting systems may include 20, 30 or more security lights.

In one embodiment, if a transformer is mounted along a chain of security lights, it is desirable to connect the home run wire to the nearest security light. In one embodiment, voltage loss may be an issue for very long chains of security lights, e.g., a chain of greater than 15 security lights. Connecting the home run wire near the center of the chain of security lights desirably reduces the voltage loss by nearly half.

Figure 19:
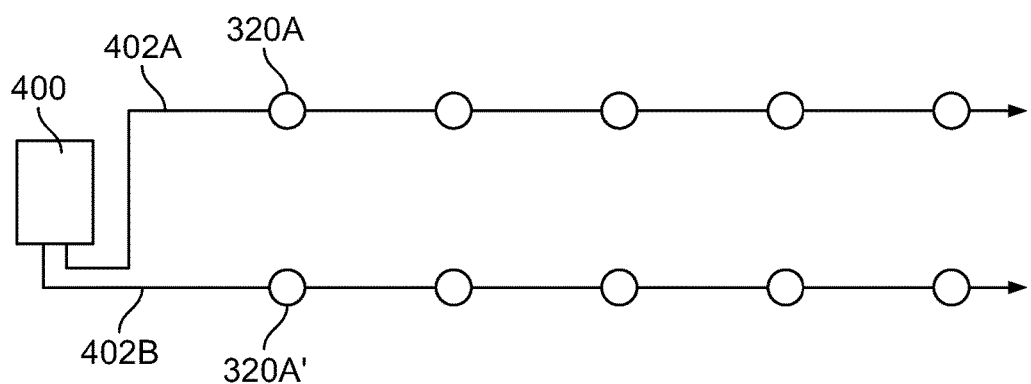
FIG. 19 shows two daisy chain wiring runs connected to a transformer, in accordance with one embodiment of the present invention.

Referring to FIG. 19, in one embodiment, a security lighting system includes a transformer 400 having a first home run wire 402A interconnecting the transformer with the first security light 320A of a first daisy chain wiring run. A second home run wire 402B interconnects the transformer 400 with a first security light 320A' of a second daisy chain wiring run.

In one embodiment, the security lighting system for a fence disclosed herein is powered by a low-voltage current, such as 12-24V AC or 12-24V DC, rather than a high voltage current, such as 120V, typically used in commercial outdoor lighting. The low-voltage current required to power the security lighting system of the present invention improves safety because currents of 30V or less present no risk for electric shock injury, which is an important safety benefit for both installers and/or users. In addition, less restrictive codes apply to the installation and operation of low-voltage lighting systems. These less restrictive codes include allowance for running wires without conduit, even when buried, and shallower burial depths. In addition, a low-voltage current requires the use of less wire in the system because the security lights may be connected directly to one another using UV resistant wire that does not require the conduit and junction boxes typically required in high voltage applications. In addition, because there is no requirement to ground the low voltage security lights disclosed herein, less wiring is utilized because the lights are connected with two-wire cable instead of the three-wire cable.

It has been determined that low-voltage currents lose power based on distance, load, and resistance. The security lighting system disclosed herein compensates for this voltage loss by allowing a wider range of voltage input (12V-24V), which is due to the design of the driver used to power the LED light sources. Installers may refer to the tables shown in FIGS. 27-29 of the present application for insuring that adequate voltage reaches each security light.

In one embodiment, the wire gauge used for the home run wire and the wires that interconnect the security lights is selected based upon system specifications. The home run wires carry the full load of the system so, for longer runs, it is preferable to use a heavier gauge for the home run wires. The electrically conductive wires that interconnect the security lights can use the same gauge as is used for the home run wire, or a lighter gauge may be used.

In one embodiment, the gauge of the home run wire is gauge #14/2 for a system having less than 20 security lights and less than 100 feet home run; gauge #12/2 for a system having more than 20 security lights or a home run wire length of 100-300 feet; and gauge #10/2 for a system having more than 20 security lights or a home run wire length of between 300-500 feet.

In one embodiment, the wire gauge of the electrical wiring used to connect adjacent security lights is gauge #14/2 for less than 15 security lights. For systems having more than 15 security lights, installers should refer to the charts shown in FIGS. 27-29 of the present application.

In one embodiment, there are at least three main steps for installing a security lighting system on a fence including mounting a transformer, mounting the security lights onto the vertical posts, and providing power to the security lights using electrically conductive wire that runs from a transformer to the security lights. The transformer may be mounted indoors, or outdoors to the side of a building, on the fence itself, or using a transformer mounting stand.

Figure 20:
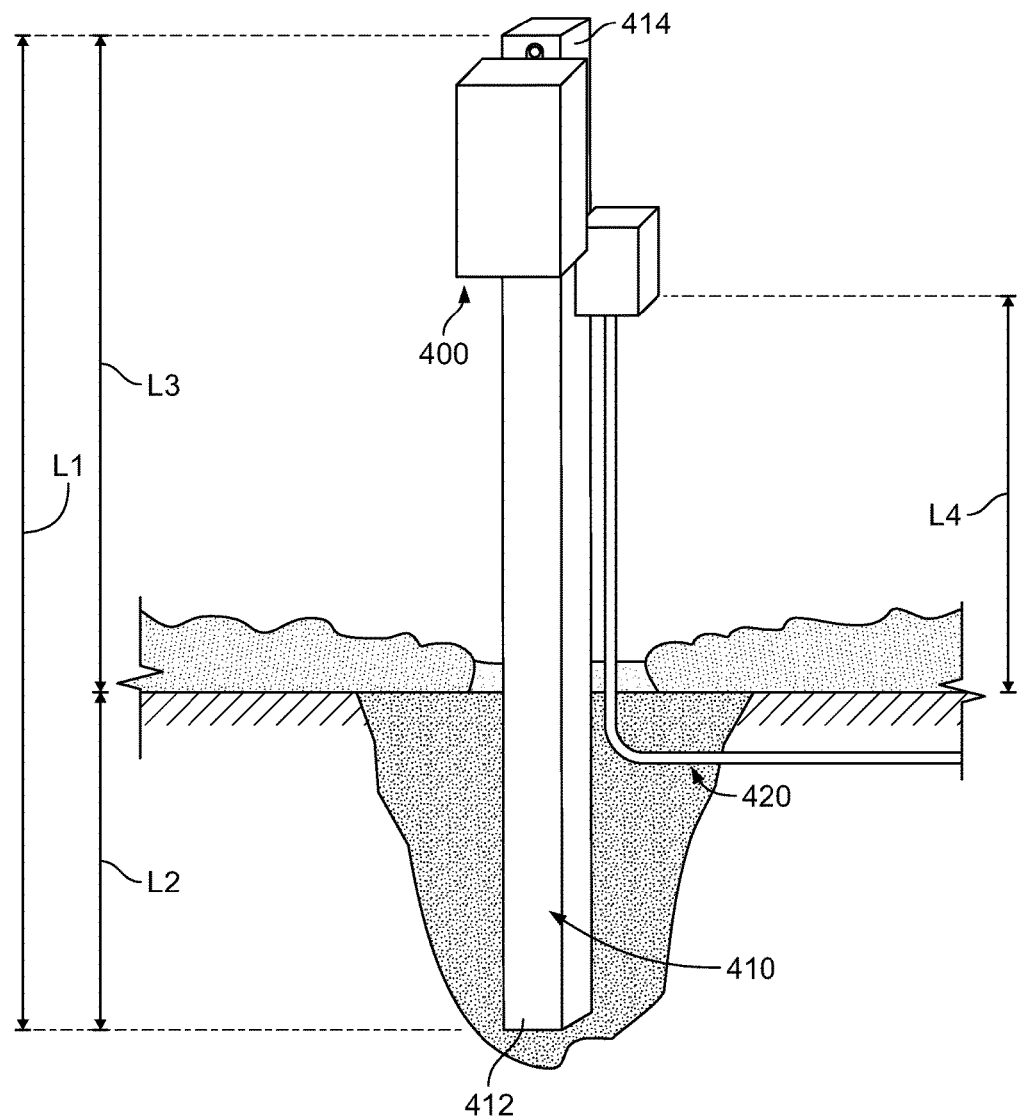
FIG. 20 shows a transformer for a security lighting system, in accordance with one embodiment of the present invention.

Referring to FIG. 20, in one embodiment, a transformer 400 is mounted outdoors using a transformer mounting stand 410. In one embodiment, the transformer mounting stand 410 may be pressured treated lumber, such as a 4"×4" railroad tie. The transformer mounting stand 410 is preferably oriented in a vertical orientation with a lower end 412 buried below grade in soil and the upper end 414 extending vertically above the ground. In one embodiment, the transformer mounting stand 410 has a total length $L_1$ of about 50-60" with a first section having a length $L_2$ of about 15-20" buried in the ground and a second section having a length $L_3$ that extends about 30-40" above the ground.

The transformer 400 is preferably mounted onto the upper end 414 of the transformer mounting stand 410. The bottom plate of the transformer 400 is preferably a distance of $L_4$ of at least 10-20" and more preferably about 12" above the ground or floor. In one embodiment, the transformer is plugged in to a GFCI receptacle fitted with an in-use weather-proof cover, or a GFCI-protective breaker for use with a non-protected receptacle with an in-use weather-proof cover adjacent to the transformer. In one embodiment, high-voltage power is provided to the transformer 400 using a 120V power line 420 that extends from a breaker panel.

Figure 21:
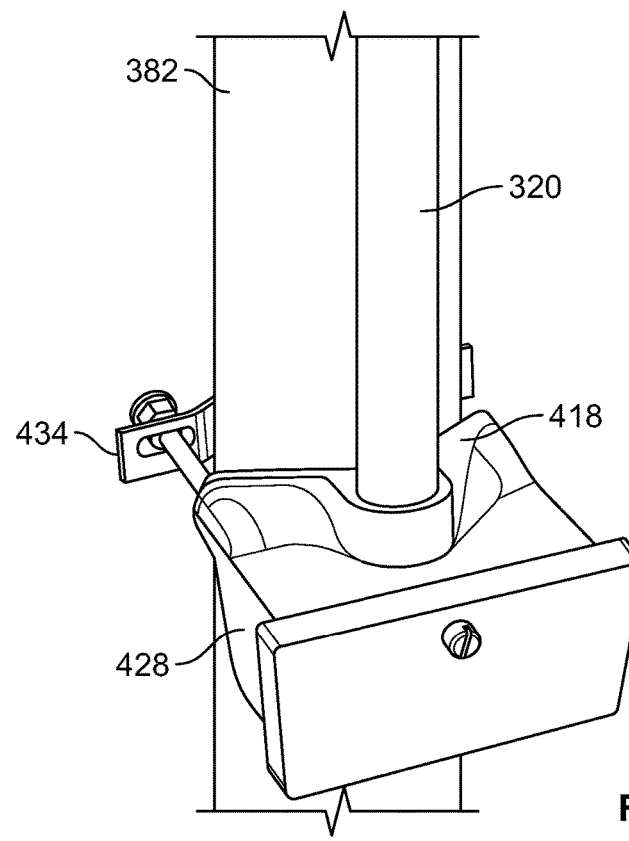
FIG. 21 shows a security light mounted to a vertical fence post using a mounting bracket, in accordance with one embodiment of the present invention.

Referring to FIG. 21, in one embodiment, each security light 320 is mounted onto one of the vertical support posts 382 of a fence using a mounting bracket 434. In one embodiment, each security light 320 includes the mounting bracket 434, such as a saddle clamp, two threaded bolts and two nuts. In one embodiment, before attaching the security light 320 to the fence, one end of the bracket 434 is attached to the junction box 428 using the supplied bolt. The nut may be backed off so that the mounting bracket 434 extends as far as possible from the rear of the junction box 428. The security light 320 may then be positioned against the vertically extending support post 382 in a desired location. The mounting bracket 434 may then be slipped between the fence post 382 and the chain links. Some fences may have very heavy chain links that are tight against the post 382. A device, such as a long screw driver or vice grips, may be used to bend the chain links away from the post 382.

In one embodiment, with the mounting bracket 434 in position, the second bolt may be passed through the bracket 434 and screwed into the rear of the securing flange 418 of the junction box 428. An installer may finger-tighten the bracket 434 by spinning the nut on one side of the bracket and then the other side, and then moving back and forth until the bracket is tight and parallel to the V-shaped securing flange 418 of the junction box 428. A tightening element, such as a wrench, may be used to tighten the nuts until the security light is securely affixed to the vertically extending support post 382. Once the bolts are tightened, the mounting bracket 434 is preferably secure and parallel to the junction box 428.

Figures 22, 23:
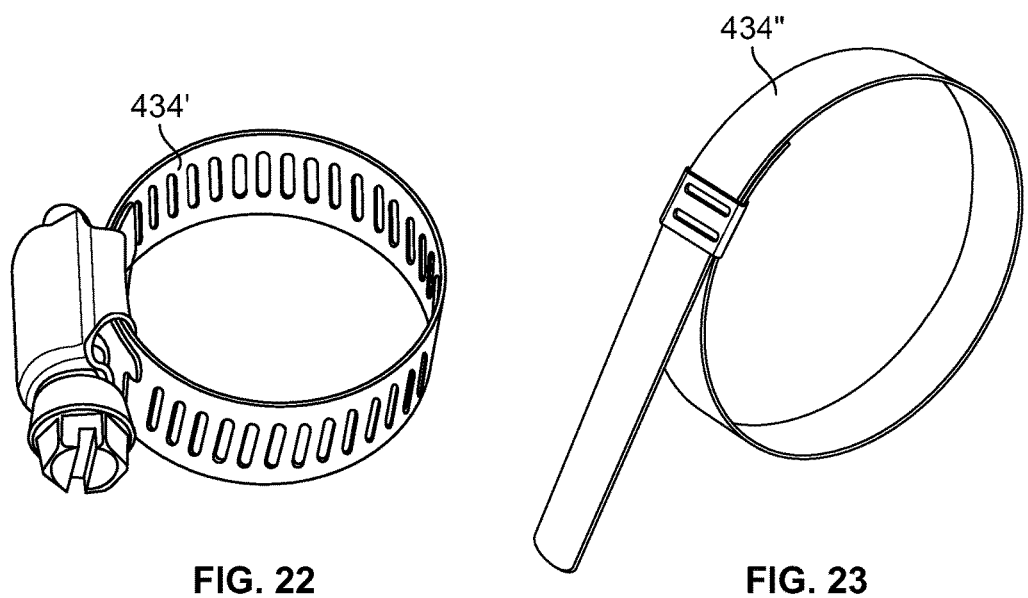
FIG. 22 shows a worm screw clamp used for mounting a security light to a vertical fence post, in accordance with one embodiment of the present invention.
FIG. 23 shows a band style crimp clamp used for mounting a security light to a vertical fence post, in accordance with another embodiment of the present invention.

Referring to FIG. 22, in one embodiment, a worm screw clamp 434' may be utilized for securing a security light to a post of a fence. In one embodiment, the worm screw clamp may engage the junction box of the security light and the post for securing the light to the post.

Referring to FIG. 23, in one embodiment, a band clamp 434" may be utilized for securing a security light to a post of a fence. In one embodiment, the band clamp may engage the junction box of the security light and the post for securing the light to the post.

In one embodiment, the clamp or bracket utilized to attach the security light to a fence may be made of a breakaway metal such as ZA27, which prevents intruders from utilizing the security light to climb over a fence. In one embodiment, if an intruder attempts to use a security light to climb over a fence, the breakaway metal clamps or brackets will release the junction box, the extension tube, the light module, and the hat 22 from the fence so that the intruder may not utilize the security to climb over the fence.

Figure 24:
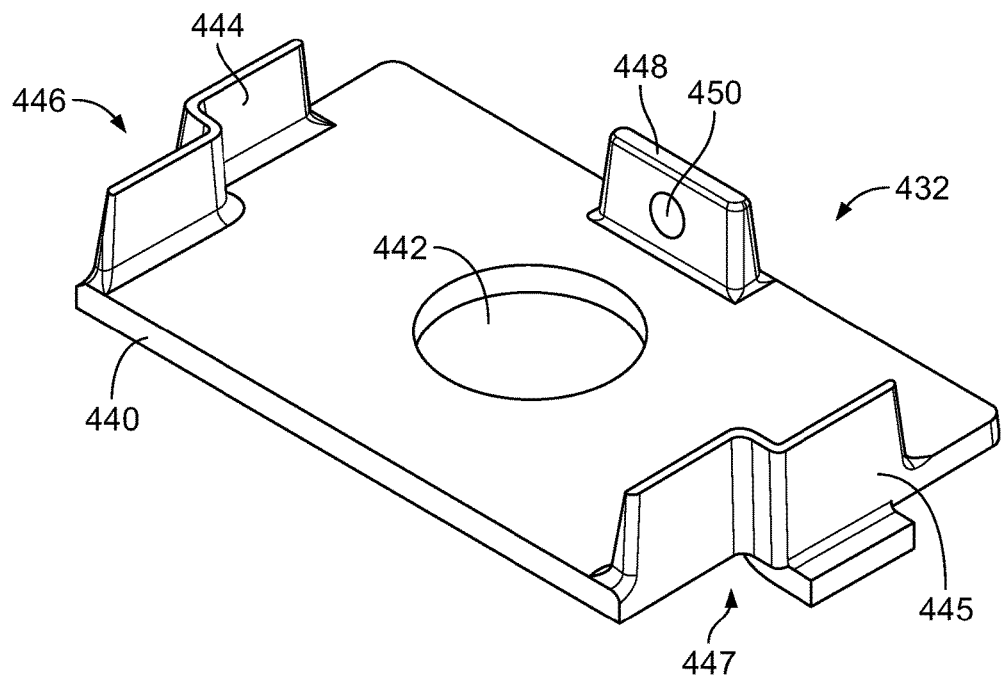
FIG. 24 shows a bottom plate for covering a bottom of a junction box of a security light, in accordance with one embodiment of the present invention.

Referring to FIG. 24, in one embodiment, a bottom cover plate 432 is adapted to pivot away from a bottom opening of a junction box for wiring a security light. In one embodiment, the bottom cover plate 432 includes a bottom wall 440 having a central opening 442 adapted to receive a conduit. The bottom cover plate includes a first support flange 444 having a first wire channel 446 and a second support flange 445 having a second wire channel 447. The bottom cover plate 432 includes a rear support flange 448 having an opening 450 extending therethrough that is adapted to receive a fastener such as a tightening screw for mounting the bottom cover plate 32 to a rear wall of a junction box 28 (FIG. 1).

In one embodiment, during initial wiring installation, the screw that couples the bottom cover plate 432 with the rear wall of the junction box remains loose in the opening 450 of the rear support flange 448, which allows the bottom cover plate 432 to drop down after the front cover 430 (FIG. 25C) is removed. The first and second wire channels 446 and 447 in the bottom cover plate 432 are designed to receive conductive wires having the various wire gauges that are typically used to wire together a string of perimeter security lights. Preferred wire gauges may include #16-2, #14-2, #12-2 and #10-2 SPT standard low voltage wire commonly used in low voltage landscape lighting applications. In one embodiment, with the bottom cover plate pivoted downwardly, the conductive wires are pressed into the first and second wiring channels 446 and 447 from the front side of the junction box, which allows for rapid installation of the wire, and which does not require cutting the wires. In addition, the first and second wiring channels 446 and 447 eliminate the need to feed the conductive wires into the junction box thru an access hole in order to make a splice connection. The first and second wiring channels also eliminate the need for additional electrical fittings such as a liquid tight fitting or a strain relief fitting. After the conductive wires have been electrically connected with a security light fixture, the bottom cover plate 432 may be lifted upwardly to sandwich the conductive wires between the first and second wire channels 446 and 447 and the side walls of the junction box, which acts as a strain relief. The bottom cover plate is lifted up and held in the upright position by the front cover. A securing element, such as a locking screw, may be used to hold the front cover plate in place over the front opening of the junction box.

In one embodiment, the screw passable through the opening 450 may be loosened so that the bottom cover plate 432, while remaining connected to the junction box, may pivot downwardly relative to the opening at the bottom of the junction box. After wiring has been passed through the first and second wiring channels 446, 447, the bottom cover plate 432 may be pivoted upwardly to seat against the bottom of the junction box and the screw 452 may be tightened for holding the bottom cover plate 432 in place.

Figure 25A:
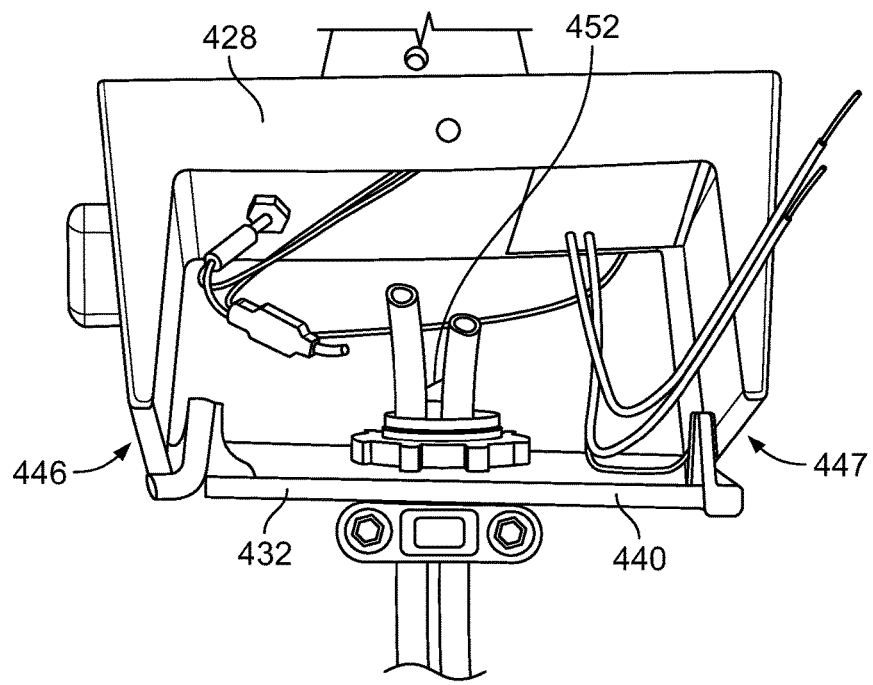
FIGS. 25A-25C show a method of pivoting the bottom plate of FIG. 24 for securing electrical wiring inside the junction box, in accordance with one embodiment of the present invention.

Referring to FIG. 25A, in one embodiment, a screw 452 connects the pivoting bottom cover plate 432 to a rear wall of a junction box 428. The screw 452 may be loosened so that the bottom wall 440 of the bottom cover plate 432 may be pivoted away from the left and right side walls of the junction box 428. When the bottom cover plate 432 is pivoted away, gaps exist between the first and second wiring channels 446, 447 and the inner surfaces of the left and right side walls of the junction box 428.

Figure 25B:
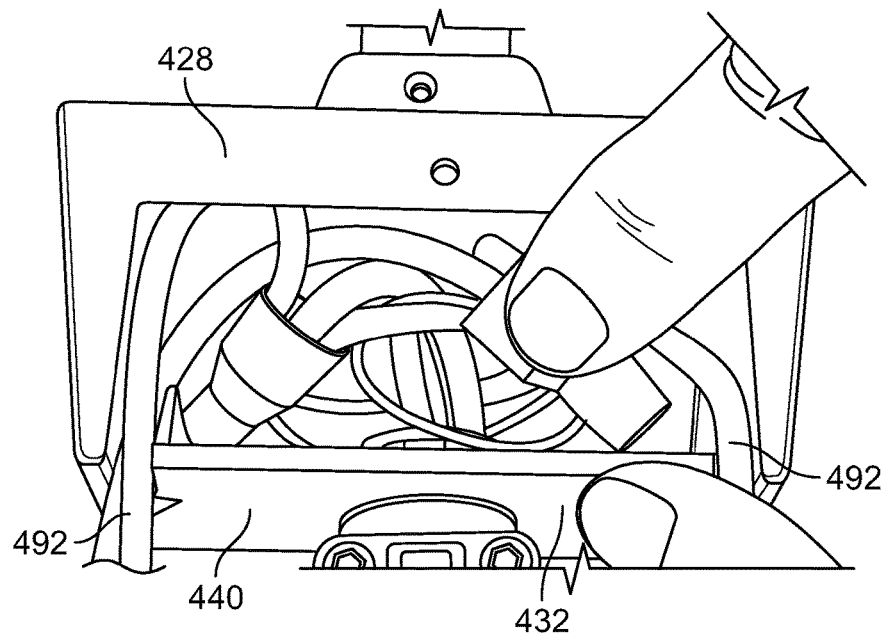
Figure 25C:
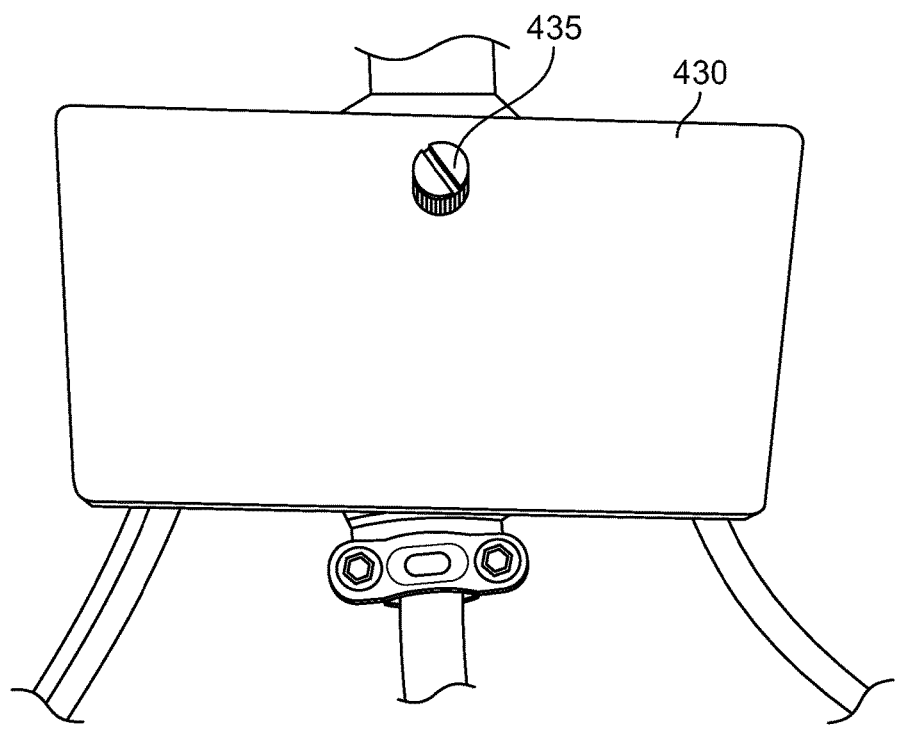

Referring to FIG. 25A, in one embodiment, with the bottom cover plate 432 pivoted downwardly, electrically conductive wiring 492 may be passed through the first and second wiring channels 446, 447 for extending into the interior of the junction box 428 for connecting the security light with the wiring 492. Referring to FIG. 25B, after the electrical interconnections have been made with the electrical components provided inside the junction box 428, the bottom wall 440 is pivoted upwardly to close the opening at the bottom of the junction box 428. The tightening screw 452 (FIG. 25A) may be tightened to hold the bottom cover plate 432 in the position shown in FIG. 25B. Referring to FIG. 25C, the front cover plate 430 may be positioned over the front opening of the junction box 428 and secured in place using a front cover plate securing screw 435.

In one embodiment, the electrically conductive wiring used to provide power to the security lights is low-voltage wire that is rated for direct burial in the ground and/or attachment to a fence without using conduit. In one embodiment, attaching low-voltage wiring directly to a fence with UV and weather-resistant cable ties provides a cost-effective solution that requires less wire, less labor, and less material expense. Although the low-voltage wire may be exposed and subject to possible tampering, it has been determined to be difficult to damage or cut a wire that has been secured to a support located inside a fence. If security is an issue, the low-voltage wire may be run through a PVC or metal conduit. If conduit is used, sections of conduit may be extended from a transformer, along horizontal fence pipes, and in vertical directions along vertical posts to each security light. Standard methods for running low-voltage wiring through conduit may be employed. In one embodiment, wire is run through the entire length of the conduit, then, at each junction, enough wire is pulled out to extend to one of the security lights. This wire loop may be cut and pushed through a vertical section of conduit for being connected with a security light.

In one embodiment that does not use conduit, a home run wire interconnects a transformer with a first security light in a daisy chain wire run or a center security light in a T-method wire run. The home run wire is connected with the first security light by passing through a bottom opening or one of the side openings provided by the first and second wire channels 446, 447 (FIG. 25A). In one embodiment, when the low-voltage wire is attached directly to the horizontal pipes and the vertical posts, the wire is preferably secured to the pipes and posts about every 18-24" such as by using permanent or re-usable cable ties. If bands or brackets on the fence are encountered, the electrically conductive wire may be run through the bands and brackets.

Figure 26:
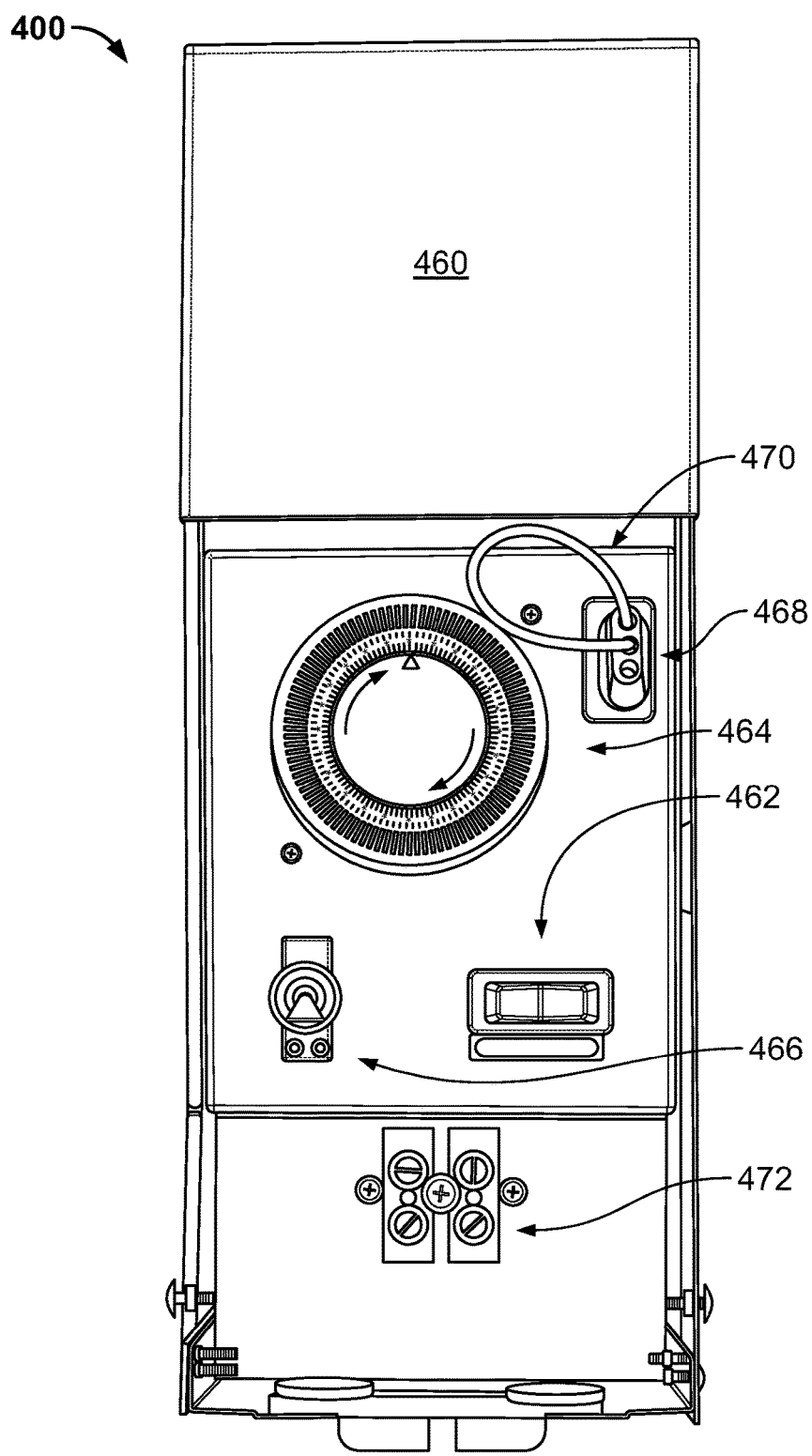
FIG. 26 shows a transformer for a security lighting system, in accordance with one embodiment of the present invention.

Referring to FIG. 26, in one embodiment, the transformer 400 for a security lighting system includes a cover 460 that may be closed over a front control panel of the transformer. In one embodiment, the transformer includes a low/off/high switch 462, a timer 464, a magnetic circuit breaker 466, a photo cell receptacle 468, a photo cell bypass plug 470 and a voltage and common tap connector 472.

In one embodiment, a home run wire is connected to the transformer 400. In one embodiment, the home run wire enters the transformer from the bottom through a knockout, such as a ½" knockout. If conduit is used, a threaded locknut adaptor is used to attach the conduit to a bottom plate of the transformer. If a conduit is not used, a strain relief is utilized to secure the home run wires entering the transformer.

In one embodiment, about ¾" of insulation is striped from each leg of paired home run wire. In one embodiment, the set screws of the voltage and common taps 472 are loosened. In one embodiment, one wire leg is inserted into a common tap, and the other wire leg is inserted into a voltage tap. The set screws are then tightened. Both wires are then tugged on to ensure a secure connection to the voltage and common taps 472.

The low/off/high switch 462 is preferably a three-position switch that changes the voltage output from low (24V), off, to high (26V). The low voltage setting is preferably utilized in all instances except for fence lines having a length of over 200 feet, or when more than 10 security lights are utilized, or when the home run line is greater than 300 feet in length.

In one embodiment, a photo cell is secured to the transformer 400. In one embodiment, the timer 464 and the photo cell acts as on/off switches in series. The timer 464 is primary so that it overrides the photo cell. In one embodiment, the timer 464 includes a dial whereby each tab on the dial controls 15 minutes of operation. When a tab is set toward the center of the dial, the power is "on." When a tab is pushed outward away from the center, the power is "off." In one embodiment, an installer may begin by rotating the dial clockwise until an arrow is aligned with the actual time. Next, the on/off cycle is set by pushing selected tabs toward the center of the dial for "on" times. When all of the tabs have been set at the center of the dial, the timer 464 is always on and the photo cell takes primary control of operation of the transformer 400 and the security light system.

In one embodiment, the transformer 400 is shipped with a photo cell bypass plug 470 in place. To install a photo cell, a knockout is removed from the right side of transformer. The photo cell bypass plug 470 is then removed and a photo cell plug is inserted through the knockout. The photo cell plug is plugged into the photo cell receptacle 468 and secured in place to the transformer using a locking ring. The head of the photo cell is preferably aimed at the sky or a bright outdoor region.

Figure 27:
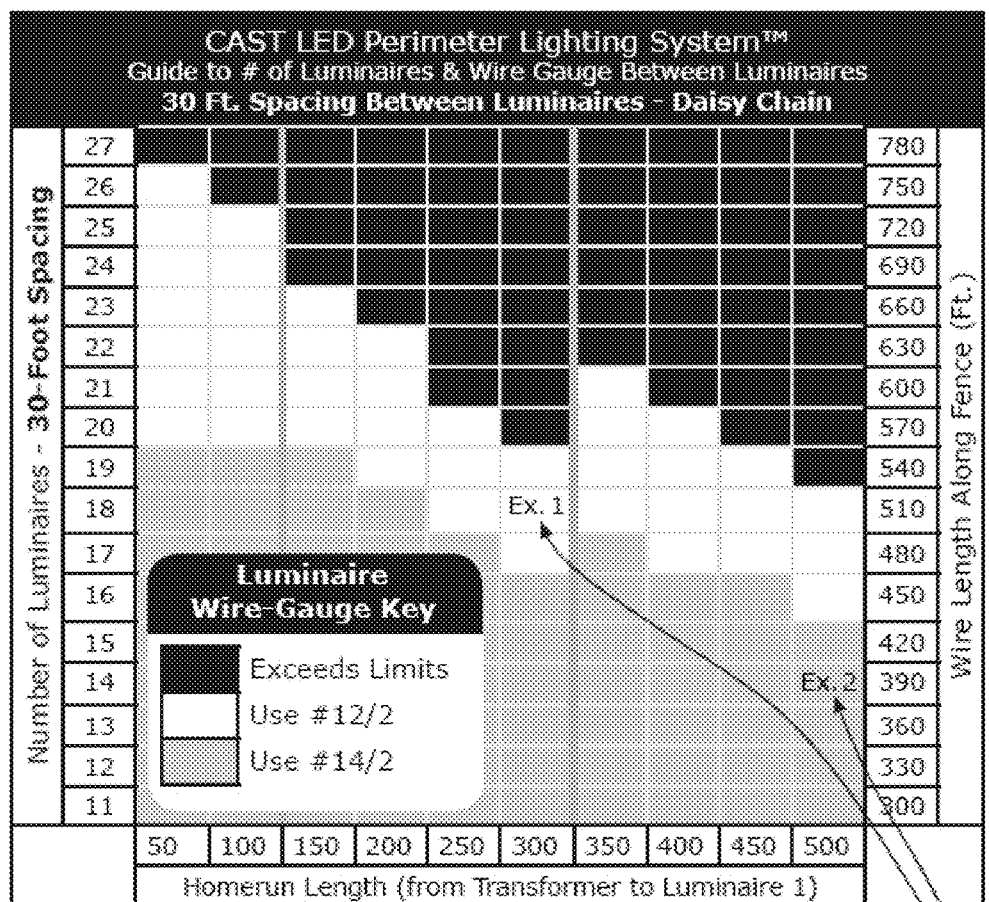
FIG. 27 shows a wire gauge selection guide for a daisy chain wire run having 30 foot spacing between adjacent security lights, in accordance with one embodiment of the present invention.
Figure 28:
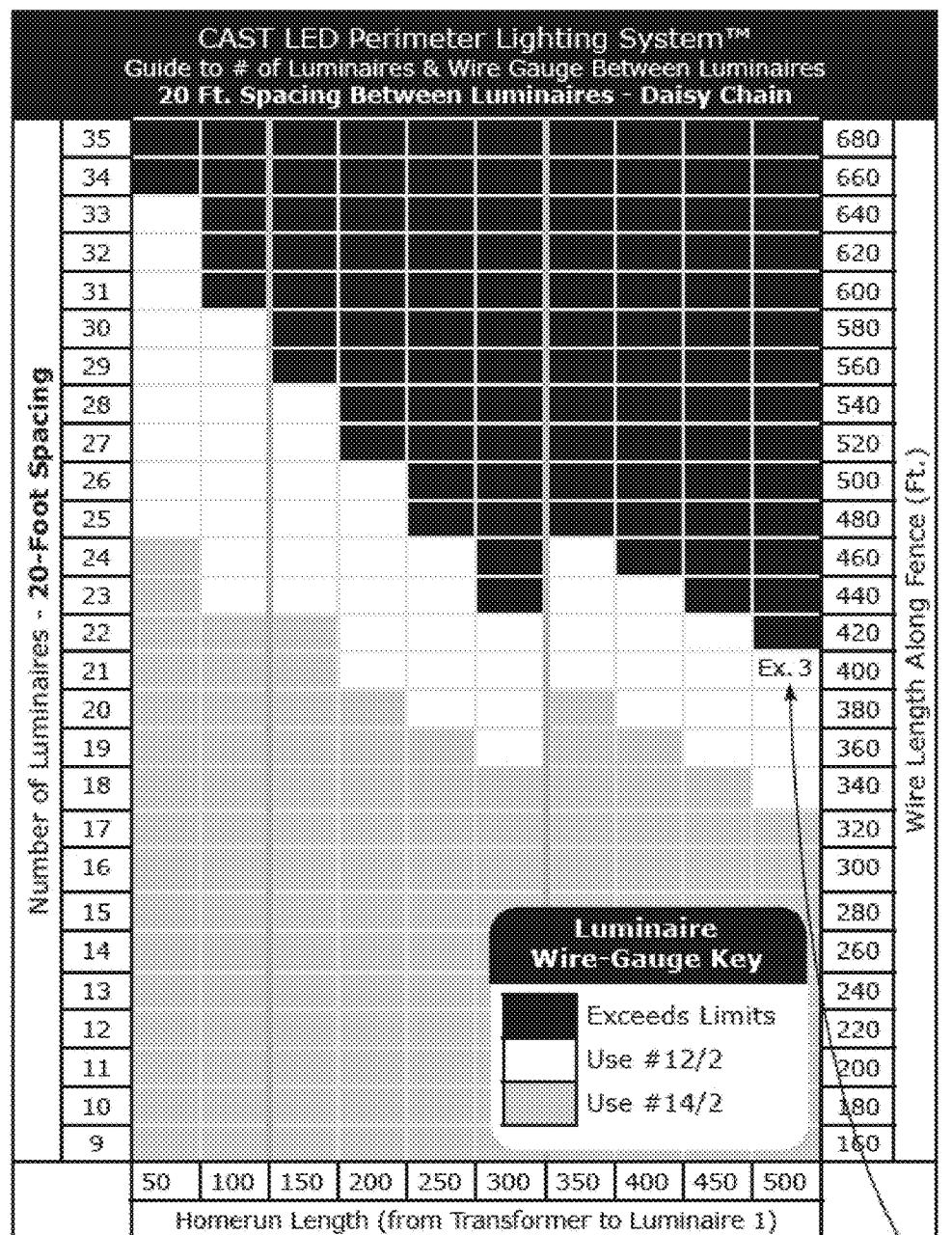
FIG. 28 shows a wire gauge selection guide for a daisy chain wire run having 20 foot spacing between adjacent security lights, in accordance with one embodiment of the present invention.
Figure 29:
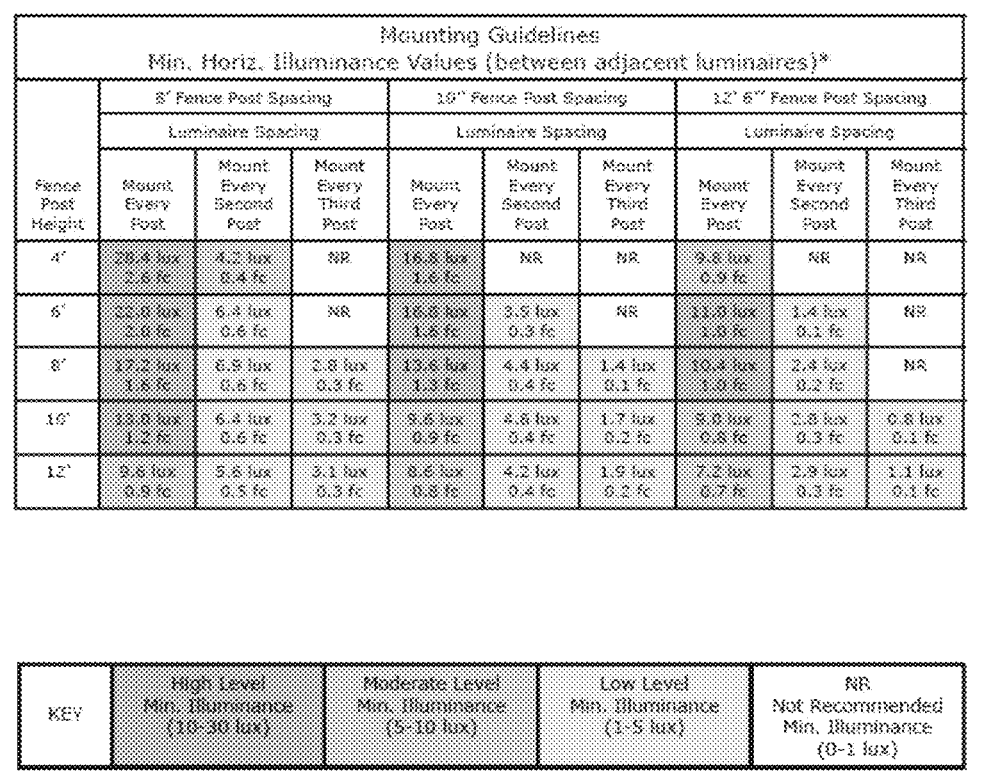

In one embodiment, the gauge of the wire that may be used is based upon how many lights are used, the spacing between the lights, and the wire length of the wire run along the fence. FIG. 27 shows a wire gauge selection guide for a system having a daisy chain wire run and 30 foot spacing between adjacent security lights. FIG. 28 shows a wire gauge selection guide for a system having a daisy chain wire run and 20 foot spacing between adjacent security lights. FIG. 29 is a chart providing mounting guidelines for attaining certain illuminance values along fences depending on fence post spacing, fence post height, and security light spacing. The chart is utilized to find information regarding fence post spacing, security light spacing and appropriate fence post height.

In one embodiment, a security light has the following electrical specifications:
Input Voltage: 12 to 24 V AV or DC (polarity independent
Input Current & Power: 0.41 A (+/−10%); 6.2 W (+/− 10%)—Use 7.0 VA for voltage loss calculations
Power Factor: 0.90 (+/−0.08)
Surge and Spike Suppression: TVS transient voltage suppressor (up to 40 V)
EMI Filtering: Inductors and capacitors for filtering to comply with FCC Class B Conducted and Radiated
Ambient Temperature Range: −40° C. to 55° C.
LED Driver: Fully encapsulated in thermally conductive epoxy
LED Array: (3) Cree XPEHEW Neutral White Chips
Lumen Depreciation (L70): 60,500 hours (according to Cree LM-80 report)
Color Temperature (CCT): 4,550° K In one embodiment, a security light system disclosed herein utilizes transformers having the following specifications:
Core Type: Magnetic toroidal, fully encapsulated in epoxy resin
Input Voltage: 120 V, 50/60 Hz AC (CPT300, CPT600); 220/240 V, 50 Hz AC (E1CPT300, E1CPT600). DC voltage input also acceptable—polarity independent.
Input Current & Power: 300 VA, 2.5 A (max) (CPT300, E1CPT300); 600 VA, 2.5 A (max) (CPT600, E1CPT600)
Output Voltage (all models): 24 V (Low Setting); 26 V (High Setting)

Output Current & Power: 300 VA, 12.5 A (max) (CPT300, E1CPT300); 600 VA, 25 A (max) (CPT600, E1CPT600)

Over-Current Protection (all models): Magnetic circuit breaker on secondary; primary thermal protection (auto reset)

Built-In Mechanical Timer: 24-hour, 15 minute on/off increments, power must be continuously supplied to transformer for timer to operate.

Figure 30:
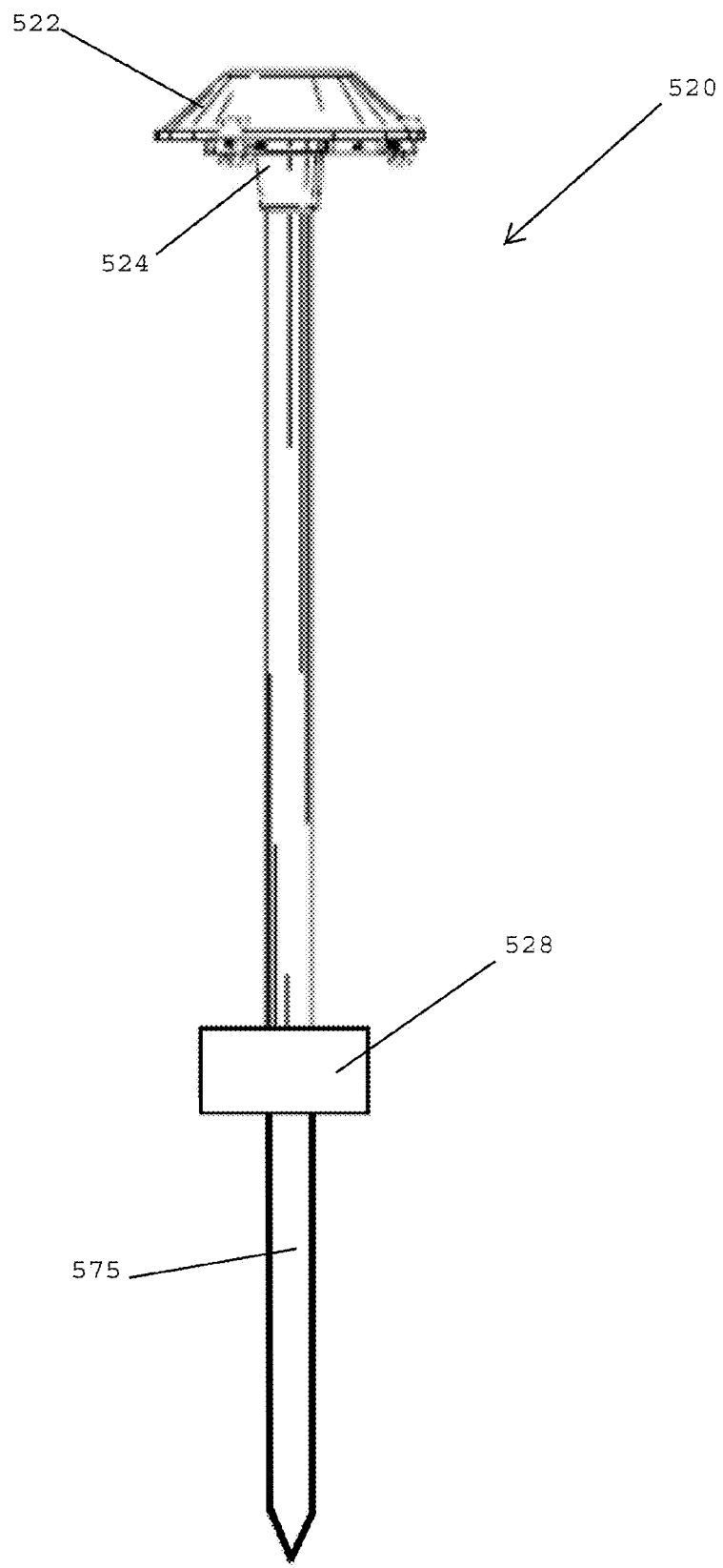
FIG. 30 shows a ground-mounted security light, in accordance with one embodiment of the present invention.

Referring to FIG. 30, in one embodiment, a security light 520 having the structure and features disclosed herein includes a ground mounting stake 575 that projects below a junction box 528 of the security light. The ground mounting stake 575 enables the security light to be anchored to the ground. Possible uses of a security light having a ground mounting stake 575 include military use, perimeter security where no fences exist, and airport uses such as lighting a runway. In one embodiment, the hat 522 may be transparent or partially transparent so that light generated by the light module 524 projects upwardly and outwardly from the hat 522 at the upper end of the security light 520.

Figure 31:
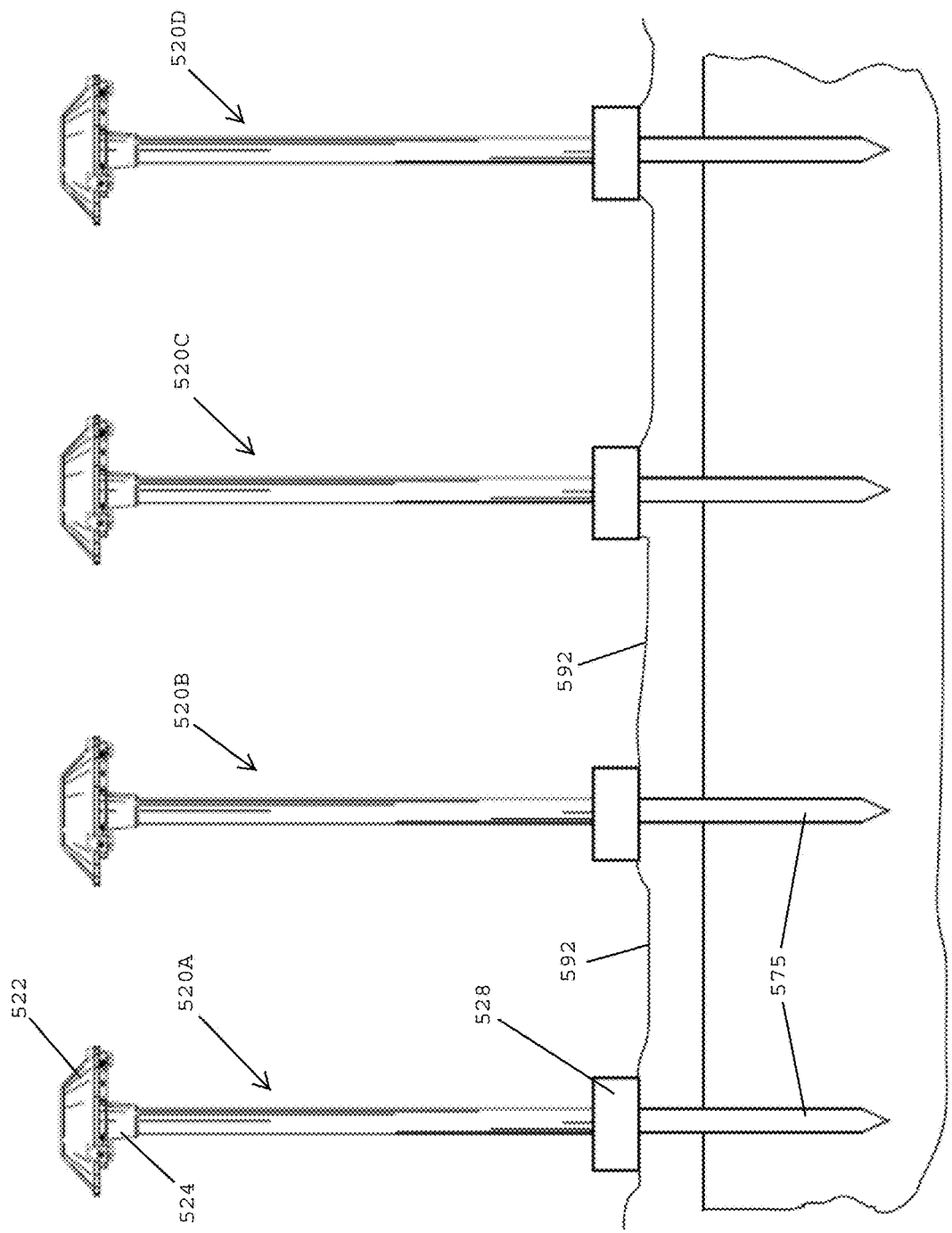
FIG. 31 shows a security lighting system having a plurality of ground-mounted security lights, in accordance with one embodiment of the present invention.

Referring to FIG. 31, in one embodiment, a security lighting system may include a plurality of ground-mounted security lights 520A-520D that are connected together using electrically conductive wire 592. The security lights 520A-520D are mounted in the ground using the ground mounting stakes 575. The junction boxes 528 are desirably spaced above the ground, such as about 12 inches above the ground. The hat 522 may be opaque so that all light generated by the security light is directed toward the ground. In one embodiment, the hat 522 may be transparent or partially transparent so that light generated by the security light propagates to the side and upwardly from the hat.

Figure 32:
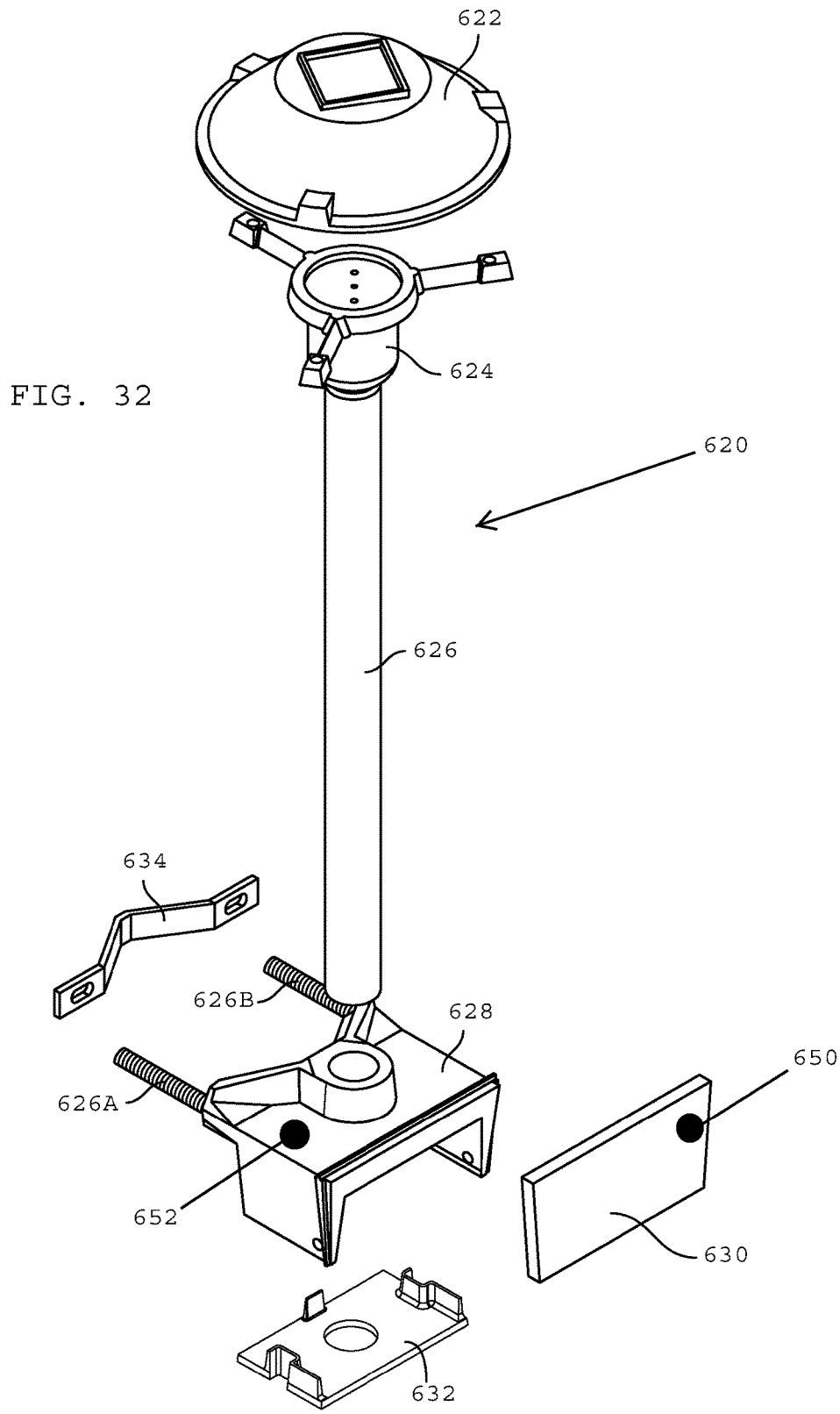
FIG. 32 shows an exploded view of a security light having sensors mounted thereon, in accordance with one embodiment of the present invention.

Referring to FIG. 32, in one embodiment, a sensor 650 is mounted on the junction box 628 for detecting sound, motion, heat, infrared, pressure changes, etc. In one embodiment, the sensor 650 is mounted onto the front cover plate 630 of the junction box 628. In one embodiment, a sensor 652 may be mounted onto the top of the junction box 628. In one embodiment, each security light 620 has at least one sensor connected therewith. The sensor may be adapted to send signals through the electrically conductive wiring (192 FIG. 12) that connects the security lights or wirelessly. The sensors may be mounted anywhere on the security light including the junction box 628, the extension tube 626 or the hat 622. In one embodiment, a sensor is not provided on every security light but is provided on every second, every third, etc. security light.

Figure 33:
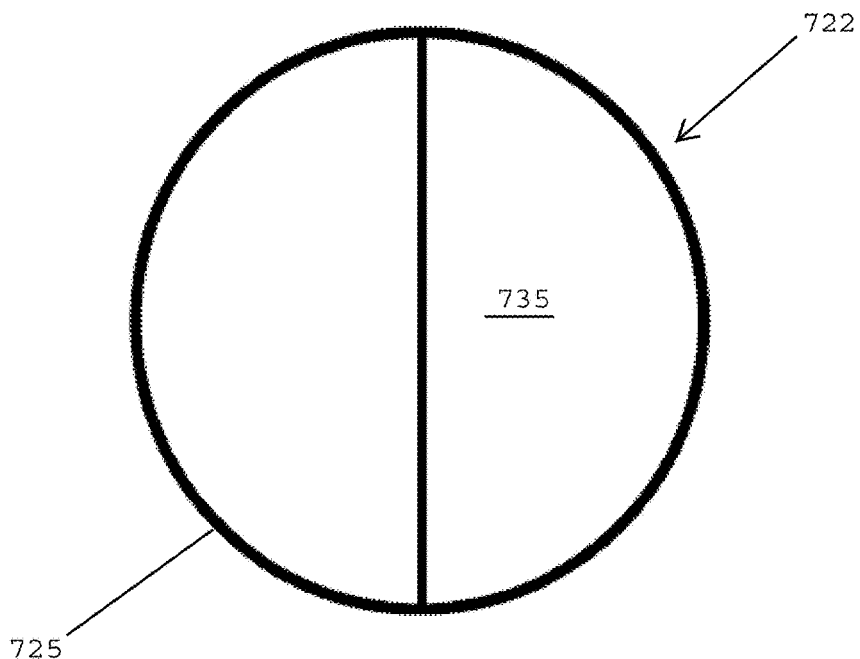
FIG. 33 shows a bottom view of a hat for a security light having a light cut-off shield that blocks the emission of light over 180 degrees of the hat, in accordance with one embodiment of the present invention.

Referring to FIG. 33, in one embodiment, a hat 722 for a security light has an outer perimeter 725. A light cutoff shield 735 or an optical light directing cover preferably covers part of the bottom of the hat 722 so that light is only able to escape from one side of the hat 722. In the embodiment shown in FIG. 33, the light cutoff shield 735 covers 180 degrees of the perimeter of the hat. This embodiment may be used when it is desirable to emit light toward the outside of a fence and block light on the inside of the fence.

Figure 34:
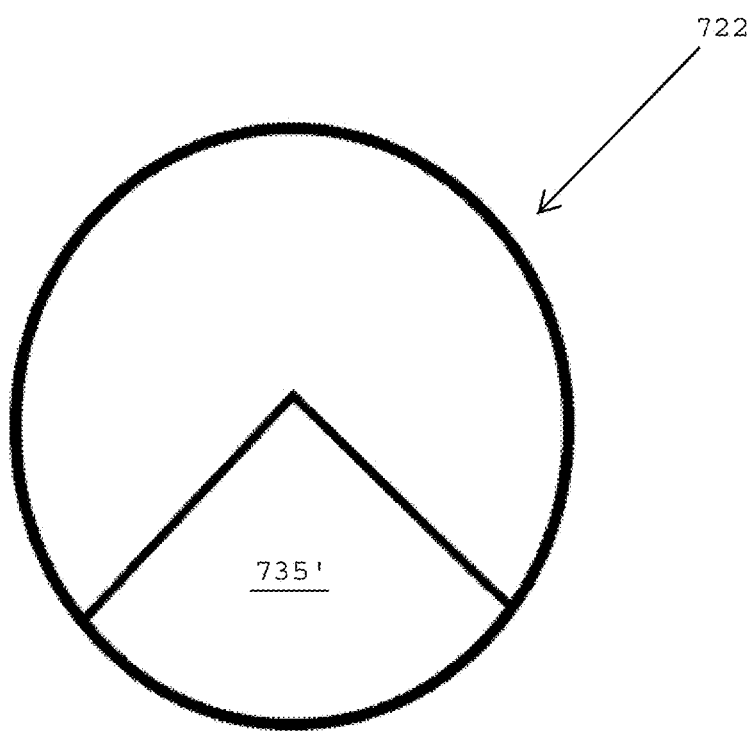
FIG. 34 shows a bottom view of a hat for a security light having a light cut-off shield that covers 90 degrees of the hat, in accordance with one embodiment of the present invention.

FIG. 34 shows another embodiment where the light cutoff shield 735' covers about 90 degrees of the perimeter of the hat 722. As a result, light can escape from the remaining 270 degrees of the hat 722. This embodiment may be used when the security light is mounted in a corner of a fence and it is desirable to emit light toward the outside of the fence and block light on the inside of the corner of the fence.

In one embodiment, control of a security light system may be managed through a central control unit. In one embodiment, the security lighting system may be operated through the browser-based operating system created by Good OS LLC, and sold under the trademark the Cloud Operating System. In one embodiment, each security light preferably has an IP addressable chip associated therewith for being monitored and controlled through the Cloud Operating System. In one embodiment, commands and signals may be transmitted through the electrical wiring used to provide power to the security lights. The commands and signals may be transmitted to wireless communication devices such as smart phones. The commands sent through the electrical wiring may also be coupled either directly or wirelessly with remote computers and guard houses. In one embodiment, commands and signals may be transmitted wirelessly to the security lights In one embodiment, the security lights have LEDs that produce white light or colored light. In one embodiment, the LEDs may change the color of the light produced by the security light if a sensor detects an intrusion or an event. In one embodiment, the LED light may blink if the sensor detects an intrusion or an event.

FIG. 35 is a chart showing the installation costs and the operating costs for a high voltage lighting system for a 500' perimeter fence. FIG. 36 shows the installation costs and the operating costs for a low voltage security lighting system disclosed in the present invention for a 500' perimeter fence. The installation costs for the high voltage system are about $17,365.00 versus $3,717.91 for the low voltage security lighting system of the present invention. The cost savings is about $13,347.09, which is about 79% less. When running for ten hours a night, each day of the year at $0.15 per KW/hr, the high voltage system uses $558.45 of power and the low voltage system uses $84.86 of power, which is a savings of $473.59 or 85% less per year.

FIG. 37 is a chart showing maintenance costs for a high voltage system that uses high voltage lamps (i.e., 120V) versus a low voltage system using low voltage LED lighting (12-24V). The LED lights have an operating life of 50,000 hours. In contrast, the high voltage lamps have an operating life of 10,000 hours. As a result, the high voltage lamps must be replaced five times more frequently than the LED lights. Thus, the high voltage lamps are more expensive than the LED lamps, and the high voltage lamps must be replaced five times during the life span of a single LED light. As shown in FIG. 37, the savings and maintenance costs over the life of a security light system is about $1,864.90.

The present invention provides a dramatic advantage over conventional security light systems that propagate direct light. In conventional systems, security personnel monitor the perimeter of the security fence by using cameras pointed at the perimeter of the fence. Unfortunately, the lights mounted atop the fence generate direct light that shines directly into the camera lens, which may "blind" the camera due to a light hot spot. The present invention overcomes this deficiency because all of the light is reflected light that does not produce hot spots. In addition, the present invention utilizes LED light as opposed to conventional lights requiring much higher voltage. As a result, the security light system disclosed herein utilizes significantly less power, which saves money. In addition, due to the security light system herein using lower power, there is no need to obtain costly permits or require the services of a professional electrician to install the system. The system made be installed by non-trained personnel that have no particular electrical training.

While the foregoing is directed to embodiments of the present invention, other and further embodiments of the invention may be devised without departing from the basic scope thereof, which is only limited by the scope of the claims that follow. For example, the present invention contemplates that any of the features shown in any of the embodiments described herein, or incorporated by reference herein, may be incorporated with any of the features shown in any of the other embodiments described herein, or incorporated by reference herein, and still fall within the scope of the present invention.

What is claimed is:

1. A security lighting system comprising:
   a plurality of security lights;
   a transformer for transforming high voltage current to low voltage current for powering said plurality of security lights;
   a wiring run comprising low voltage electrically conductive wiring for interconnecting said plurality of security lights to the low voltage current provided by said transformer;
   each said security light comprising a light module including a low voltage LED light for generating light, and a junction box coupled with said light module, said junction box having an interior compartment containing electrical components including a microprocessor connected with said LED light for controlling operation of said LED light, said junction box including a rear end, a front end including a front opening that faces away from said rear end, and a bottom opening, wherein said electrical components within said junction box are electrically connected with said conductive wiring of said wiring run;
   a clamping assembly coupled with said junction box for securing said security light to a fixed element so that said rear end of said junction box opposes said fixed element, said front opening of said junction box faces away from said fixed element, and said bottom opening of said junction box faces toward a lower end of said fixed element;
   a bottom cover plate pivotally coupled with said junction box for moving between an up position and a down position, said bottom cover plate including a bottom wall having a front edge, a rear edge, and left and right sides extending from the front edge to the rear edge, said bottom cover plate including a first support flange extending upwardly from the left side of said bottom wall, said first support flange having a distal section and a proximal section adjacent the front edge of said bottom wall that defines a first wire channel, said bottom cover plate including a second support flange extending upwardly from the right side of said bottom wall that opposes said first support flange, said second support flange having a distal section and a proximal section adjacent the front edge of said bottom wall that defines a second wire channel, wherein the distance between the proximal sections of said first and second support flanges that define said first and second wire channels is less than the distance between the distal sections of said first and second support flanges; wherein when said bottom cover plate is held in the up position, said conductive wiring of said wiring run passes between said first and second wire channels and respective side walls of said junction box for electrically interconnecting with said electrical components contained within said junction box; and
   a front cover plate for covering said front opening of said junction box, wherein with said junction box secured to said fixed element by said clamping assembly, when said front cover plate is removed from said junction box for uncovering said front opening of said junction box, said bottom cover plate is free to pivot from the up position to the down position, and wherein when said front cover plate is assembled with said front end of said junction box for covering said front opening of said junction box, said front cover plate holds said bottom cover plate in the up position for preventing said bottom cover plate from pivoting between the up position and the down position.

2. The system as claimed in claim 1, wherein in the down position said bottom cover plate is pivoted away from said bottom opening of said junction box to provide access through said bottom opening for electrically interconnecting said electrical components contained within said junction box with said conductive wiring of said wiring run.

3. The system as claimed in claim 1, further comprising a fastener for pivotally coupling said bottom cover plate with said rear wall of said junction box, wherein said fastener has a first position in which said bottom cover plate is free to pivot away from said bottom of said junction box for providing access to said bottom opening and a second position in which said bottom cover plate is held in the up position for closing said bottom opening.

4. The system as claimed in claim 3, wherein said bottom cover plate includes a rear support flange having an opening extending therethrough that is adapted to receive said fastener for coupling said bottom cover plate with said rear wall of said junction box.

5. The system as claimed in claim 4, wherein said fastener is a tightening screw that is loose in the first fastener position for allowing said bottom cover plate to pivot away from said bottom opening of said junction box and tighter in the second fastener position for holding said bottom cover plate in the up position for closing said bottom opening.

6. The system as claimed in claim 5, further comprising a front cover plate screw for securing said front cover plate to said front end of said junction box for covering said front opening.

7. The system as claimed in claim 6, wherein said first and second wire channels and said respective side walls of said junction box define gaps therebetween that are larger when said bottom cover plate is in the down position and smaller when said bottom cover plate is in the up position.

8. The system as claimed in claim 7, wherein when said bottom cover plate is in the up position said conductive wiring of said wiring run is sandwiched between said first and second wiring channels and said side walls of said junction box for providing strain relief for said conductive wiring of said wiring run.

9. The system as claimed in claim 1, wherein said high voltage current is 120V and said low voltage current is 12-24V.

10. The system as claimed in claim 1, wherein each said security light further comprises a light module having said LED light and a hat overlying said LED light that blocks the escape of direct light from said light module while allowing reflected light to escape from said light module.

11. The system as claimed in claim 10, wherein said hat is opaque.

12. The system as claimed in claim 11, wherein each said light module comprises:
   a central housing having an upper end with a top surface;
   support arms extending outwardly from said central housing;
   a depression formed in the top surface of said central housing; and said LED light disposed in said depression, wherein said support arms extend outwardly from said central housing, each said support arm having a top surface that lies in a plane that is parallel to the top surface of said central housing, wherein said hat is secured to said support arms, wherein each said support arm has a triangular shaped cross-section for minimizing the surface area of said support arm facing an underside of said hat, and wherein said hat has a bottom surface having a concave shape that overlies said LED light.

13. The system as claimed in claim 12, further comprising an extension tube having an upper end secured to said light module and a lower end secured to said junction box.

14. The system as claimed in claim 1, further comprising:
an alignment system separate from said clamping assembly and coupled with said junction box for aligning said security light with the longitudinal axis of the one of said fixed elements, wherein said rear end of said junction box includes a V-shaped securing flange abutted against an outer surface of said fixed element, said alignment system including a first alignment element comprising a first threaded shaft that extends through a first threaded opening in a first wing of said V-shaped securing flange, a second alignment element comprising a second threaded shaft that extends through a second threaded opening in a second wing of said V-shaped securing flange, and a third alignment element comprising a third threaded shaft that extends through a threaded opening in a rear wall of said junction box.

15. The system as claimed in claim 1, wherein each said security light includes a sensor mounted thereon that is selected from the group consisting of a motion sensor, a heat sensor, an infrared sensor, a sound sensor and a pressure sensor.

16. The system as claimed in claim 1, wherein each said security light has an IP addressable chip for controlling and monitoring said security light through a web based operating system.

17. The system as claimed in claim 1, said front cover plate comprising a front wall having an outer surface and an inner surface, said front cover plate further comprising an upper edge, a lower edge, and opposing side edges that surround said inner surface of said front wall to define a pocket, wherein said front end of said junction box is received within said pocket when said front cover plate is assembled with said front end of said junction box.

18. The system as claimed in claim 17, wherein said front end of said junction box comprises a ridge that extends around a perimeter of said front opening for preventing moisture from entering said interior compartment of said junction box, and wherein said ridge is received within said pocket when said front cover plate is assembled with said front end of said junction box.

19. A security lighting system for a fence having a plurality of security lights mountable to upper ends of fence posts comprising:
a fence having a plurality of fence posts;
a plurality of security lights mounted to upper ends of said fence posts;
each said security light comprising a light module including a central housing having a top surface, a depression formed in the top surface of said central housing, and a LED light mounted in the depression for generating light that projects away from and over the top surface of said central housing;
a hat covering the top surface and an outer perimeter of said central housing for blocking the escape of direct light from the top and sides of said light module while allowing reflected light to escape from a bottom of said light module;
said hat having a concave shaped bottom surface with a reflective coating that opposes said LED light for reflecting light generated by said LED light toward the bottom of said light module;
a junction box having an interior compartment adapted to contain electrical components including a microprocessor for controlling operation of said LED light and said security light, said junction box including a rear wall, a front end including a front opening that faces away from said rear wall, and a bottom opening;
an extension tube having an upper end secured to said central housing of said light module and a lower end secured to said junction box, said extension tube having a central conduit for passing electrical wiring from said junction box to said light module;
a clamping assembly coupled with said junction box for securing said junction box to one of said fence posts so that said rear wall of said junction box faces toward the one of said fence posts, said front opening of said junction box faces away from the one of said fence posts, and said bottom opening of said junction box faces toward a lower end of the one of said fence posts;
electrical wiring interconnecting said plurality of security lights;
a transformer connected with said electrical wiring for providing low voltage power to said plurality of security lights, wherein said transformer transforms high voltage to low voltage for powering said LED lights;
a bottom cover plate covering said bottom opening of said junction box, said bottom cover plate being pivotally coupled with said junction box for moving between an up position and a down position; said bottom cover plate including a bottom wall having a front edge, a rear edge, and left and right sides extending from the front edge to the rear edge, said bottom cover plate including a first support flange extending upwardly from the left side of said bottom wall, said first support flange having a distal section and a proximal section adjacent the front edge of said bottom wall that defines a first wire channel, said bottom cover plate including a second support flange extending upwardly from the right side of said bottom wall that opposes said first support flange, said second support flange having a distal section and a proximal section adjacent the front edge of said bottom wall that defines a second wire channel, wherein the distance between the proximal sections of said first and second support flanges that define said first and second wire channels is less than the distance between the distal sections of said first and second support flange; wherein when said bottom cover plate is held in the up position, said electrical wiring passes between said first and second wire channels and respective side walls of said junction box for electrically interconnecting with said electrical components contained within said junction box
a front cover plate for covering said front opening of said junction box, wherein with said junction box secured to the one of said fence posts by said clamping assembly, when said front cover plate is removed from said junction box for uncovering said front opening of said junction box, said bottom cover plate is free to pivot from the up position to the down position, and wherein when said front cover plate is assembled with said front end of said junction box for covering said front opening of said junction box, said front cover plate holds said bottom cover plate in the up position for preventing said bottom cover plate from pivoting between the up position and the down position; and an alignment system separate from said clamping assembly and coupled with said junction box for aligning said extension tube with a longitudinal axis of the one of said fence posts, wherein a rear end of said junction box includes a V-shaped securing flange abutted against an outer surface of the one of said fence posts, said alignment system including a first alignment element comprising a first threaded shaft that extends through a first threaded opening in a first wing of said V-shaped securing flange, a second alignment element comprising a second threaded shaft that extends through a second threaded opening in a second wing of said V-shaped securing flange, and a third alignment element comprising a third threaded shaft that extends through a threaded opening in said rear wall of said junction box.

20. The system as claimed in claim 19, said front cover plate comprising a front wall having an outer surface and an inner surface, said front cover plate further comprising an upper edge, a lower edge, and opposing side edges that surround said inner surface of said front wall to define a pocket, wherein said front end of said junction box is received within said pocket when said front cover plate is assembled with said front end of said junction box.

21. The system as claimed in claim 20, wherein said front end of said junction box comprises a ridge that extends around a perimeter of said front opening for preventing moisture from entering said interior compartment of said junction box, and wherein said ridge is received within said pocket when said front cover plate is assembled with said front end of said junction box.

* * * * *